(12) United States Patent
Turney et al.

(10) Patent No.: US 11,415,334 B2
(45) Date of Patent: Aug. 16, 2022

(54) BUILDING CONTROL SYSTEM WITH AUTOMATIC COMFORT CONSTRAINT GENERATION

(71) Applicant: Johnson Controls Technology Company, Auburn Hills, MI (US)

(72) Inventors: Robert D. Turney, Watertown, WI (US); Mohammad N. ElBsat, Milwaukee, WI (US); Matthew J. Ellis, Milwaukee, WI (US); Anas W. I. Alanqar, Milwaukee, WI (US); Michael J. Wenzel, Oak Creek, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 110 days.

(21) Appl. No.: 16/405,724

(22) Filed: May 7, 2019

(65) Prior Publication Data

US 2019/0338974 A1  Nov. 7, 2019

Related U.S. Application Data

(60) Provisional application No. 62/667,979, filed on May 7, 2018, provisional application No. 62/667,901, filed on May 7, 2018.

(51) Int. Cl.
*F24F 11/47* (2018.01)
*F24F 11/56* (2018.01)
(Continued)

(52) U.S. Cl.
CPC .............. *F24F 11/47* (2018.01); *F24F 11/56* (2018.01); *F24F 11/64* (2018.01); *F24F 11/65* (2018.01);
(Continued)

(58) Field of Classification Search
CPC .. F24F 11/47; F24F 11/56; F24F 11/64; F24F 11/65; F24F 11/70; F24F 2110/10;
(Continued)

(56) References Cited

U.S. PATENT DOCUMENTS

| 5,135,045 A | 8/1992 | Moon |
| 6,780,011 B2 | 8/2004 | Davidov et al. |

(Continued)

FOREIGN PATENT DOCUMENTS

| CN | 101140450 | 3/2008 |
| CN | 102375443 | 3/2012 |

(Continued)

OTHER PUBLICATIONS

Pengwei Du et al. ("Appliance Commitment for Household Load Scheduling", IEEE Transactions on Smart Grid. vol. 2, No. 2, Jun. 2011, pp. 411-419.) (Year: 2011).*

(Continued)

*Primary Examiner* — Chad G Erdman
(74) *Attorney, Agent, or Firm* — Foley & Lardner LLP

(57) ABSTRACT

A controller for maintaining occupant comfort in a space of a building. The controller includes processors and non-transitory computer-readable media storing instructions that, when executed by the processors, cause the processors to perform operations. The operations include obtaining building data and obtaining occupant comfort data. The operations include generating an occupant comfort model relating the building data to a level of occupant comfort within the space based on the building data and the occupant comfort data. The operations include generating time-varying comfort constraint for an environmental condition of the space using the occupant comfort model and include performing a cost optimization of a cost function of operating building equipment over a time duration to determine a setpoint for (Continued)

the building equipment. The operations include operating the building equipment based on the setpoint to affect the variable state or condition of the space.

20 Claims, 16 Drawing Sheets

(51) Int. Cl.
| | |
|---|---|
| *F24F 11/64* | (2018.01) |
| *F24F 11/65* | (2018.01) |
| *F24F 11/70* | (2018.01) |
| *G05B 19/042* | (2006.01) |
| *F24F 120/20* | (2018.01) |
| *F24F 120/12* | (2018.01) |
| *F24F 130/10* | (2018.01) |
| *F24F 140/50* | (2018.01) |
| *F24F 140/60* | (2018.01) |
| *F24F 110/10* | (2018.01) |

(52) U.S. Cl.
CPC ............ *F24F 11/70* (2018.01); *G05B 19/042* (2013.01); *F24F 2110/10* (2018.01); *F24F 2120/12* (2018.01); *F24F 2120/20* (2018.01); *F24F 2130/10* (2018.01); *F24F 2140/50* (2018.01); *F24F 2140/60* (2018.01); *G05B 2219/2614* (2013.01)

(58) Field of Classification Search
CPC ............... F24F 2120/12; F24F 2120/20; F24F 2130/10; F24F 2140/50; F24F 2140/60; G05B 15/02; G05B 19/042; G05B 2219/2614; G05B 2219/2642
See application file for complete search history.

(56) References Cited

U.S. PATENT DOCUMENTS

| | | | |
|---|---|---|---|
| 9,250,633 B2 | 2/2016 | Chen et al. | |
| 9,429,923 B2 | 8/2016 | Ward et al. | |
| 10,146,237 B2 | 12/2018 | Turney et al. | |
| 11,060,745 B1* | 7/2021 | Johnson | G05B 15/02 |
| 2007/0168057 A1 | 7/2007 | Blevins et al. | |
| 2007/0231119 A1 | 10/2007 | Shen et al. | |
| 2011/0106328 A1 | 5/2011 | Zhou et al. | |
| 2013/0013118 A1* | 1/2013 | Merkulov | G05D 23/1902 700/286 |
| 2013/0013124 A1* | 1/2013 | Park | G06F 3/04847 700/296 |
| 2014/0288890 A1 | 9/2014 | Khainson et al. | |
| 2015/0168003 A1 | 6/2015 | Stefanski et al. | |
| 2015/0192911 A1* | 7/2015 | Sloop | G05D 23/1917 700/291 |
| 2015/0316901 A1 | 11/2015 | Wenzel et al. | |
| 2016/0305678 A1* | 10/2016 | Pavlovski | F24F 11/62 |
| 2017/0003150 A1 | 1/2017 | Noboa et al. | |
| 2017/0211830 A1 | 7/2017 | Kosaka et al. | |
| 2017/0364105 A1 | 12/2017 | Greene et al. | |
| 2018/0197253 A1 | 7/2018 | Elbsat et al. | |
| 2018/0224814 A1 | 8/2018 | Elbsat et al. | |
| 2018/0285800 A1 | 10/2018 | Wenzel et al. | |
| 2018/0313557 A1 | 11/2018 | Turney et al. | |
| 2018/0357577 A1 | 12/2018 | Elbsat et al. | |
| 2019/0079473 A1 | 3/2019 | Kumar et al. | |
| 2019/0158305 A1* | 5/2019 | Cui | F24F 11/58 |
| 2019/0171171 A1* | 6/2019 | Verteletskyi | G06Q 90/205 |
| 2019/0187634 A1* | 6/2019 | Fan | F24F 11/65 |
| 2019/0287147 A1 | 9/2019 | Ingale et al. | |
| 2019/0338973 A1 | 11/2019 | Turney et al. | |
| 2020/0072543 A1 | 3/2020 | Turney et al. | |
| 2021/0055016 A1 | 2/2021 | Turney | |

FOREIGN PATENT DOCUMENTS

| | | |
|---|---|---|
| CN | 104620182 | 5/2015 |
| CN | 105247519 | 1/2016 |
| CN | 106127337 | 11/2016 |
| JP | 2009-518750 | 5/2009 |
| JP | 2017-133707 A | 8/2017 |
| JP | 2019-196898 A | 11/2019 |
| WO | WO-2016/201353 A1 | 12/2016 |

OTHER PUBLICATIONS

U.S. Appl. No. 16/404,030, filed May 6, 2019, Johnson Controls Technology Company.
Batterman, Stuart. Review and Extension of CO2-Based Methods to Determine Ventilation Rates with Application to School Classrooms. International Journal of Environmental Research and Public Health. Feb. 4, 2017. 22 Pages.
Chen, Xiao; Wang, Qian; Srebric, Jelena. Occupant Feedback Based Model Predictive Control for Thermal Comfort and Energy Optimization: A Chamber Experimental Evaluation. Applied Energy 164. 2016, pp. 341-351.
Kang et al., Novel Modeling and Control Strategies for a HVAC System Including Carbon Dioxide Control. Jun. 2, 2014. 19 Pages.
Lampinen, Markku J. Thermodynamics of Humid Air. Sep. 2015. 39 Pages.
Luo, Xiaoyan. Maximizing Thermal Comfort and International Design. Loughborough University. Jan. 18, 2019. 4 Pages.
Sama Aghniaey et al., The Assumption of Equidistance in the Seven-Point Thermal Sensation Scale and a Comparison between Categorical and Continuous Metrics. University of Georgia College of Engineering, Jan. 18, 2019. 4 Pages.
Sudhakaran, Saurabh; Shaurette Mark. Temperature, Relative Humidity, and CarbonDioxide Modulation in a Near-Zero Energy Efficient Retrofit House. Purdue University. 2016, 11 Pages.
Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.
Office Action on IN 201944017378, dated Jul. 29, 2020, 6 pages.
Office Action on JP 2019-086368, dated Jul. 28, 2020, 7 pages with English translation.
Office Action on CN 201910372048.8, dated Sep. 17, 2020, 30 pages with English language translation.
Notice of Allowance on CN 201910372048.8, dated May 26, 2021, 4 pages with English language translation.
JP Office Action on JP Appl. Ser. No. 2021-016288 dated Apr. 5, 2022, with translation (10 pages).

* cited by examiner

BUILDING CONTROL SYSTEM WITH AUTOMATIC COMFORT CONSTRAINT GENERATION

CROSS-REFERENCE TO RELATED PATENT APPLICATIONS

This application claims the benefit of and priority to U.S. Provisional Patent Application No. 62/667,979, filed May 7, 2018, and U.S. Provisional Patent Application No. 62/667,901, filed May 7, 2018, both of which are incorporated herein by reference in their entireties.

BACKGROUND

The present disclosure relates generally to a heating, ventilation, and air conditioning (HVAC) system for a building and more particularly to an HVAC system that uses artificial intelligence to determine comfort ranges for the building.

Maintaining occupant comfort in a building requires building equipment (e.g., HVAC equipment) to be operated to change environmental conditions in the building. In typical systems, occupants are required to make any desired changes to the environmental conditions themselves if they are not comfortable. Requiring occupants to make desired changes to the environmental conditions themselves can waste the occupants' time and energy. Further, maintaining occupant comfort can be expensive if not performed correctly. Thus, systems and methods are needed to maintain occupant comfort while reducing expenses related to maintaining occupant comfort.

SUMMARY

One implementation of the present disclosure is a controller for maintaining occupant comfort in a space of a building, according to some embodiments. The controller includes one or more processors, according to some embodiments. The controller includes one or more non-transitory computer-readable media storing instructions that, when executed by the one or more processors, cause the one or more processors to perform operations, according to some embodiments. The operations include obtaining building data, according to some embodiments. The operations include obtaining occupant comfort data, according to some embodiments. The operations include generating an occupant comfort model based on the building data and the occupant comfort data, according to some embodiments. The occupant comfort model relates the building data to a level of occupant comfort within the space, according to some embodiments. The operations include generating time-varying comfort constraints for an environmental condition of the space using the occupant comfort model, according to some embodiments. The operations include performing a cost optimization of a cost function of operating building equipment over a time duration to determine a setpoint for the building equipment, according to some embodiments. The cost optimization is performed subject to the time-varying comfort constraints, according to some embodiments. The operations include operating the building equipment based on the setpoint to affect the variable state or condition of the space to maintain the occupant comfort in the space, according to some embodiments.

In some embodiments, the operations include updating the occupant comfort model in response to obtaining additional occupant comfort data, according to some embodiments.

In some embodiments, the building data indicates one or more conditions of the space during each of a plurality of subperiods within a time period and describes a plurality of attributes of each of the plurality of subperiods. The plurality of attributes of each of the plurality of subperiods include at least one of a time of day, a day of a week, or weather conditions, according to some embodiments.

In some embodiments, the time-varying comfort constraints define a temperature setpoint range for the space.

In some embodiments, obtaining the occupant comfort data includes monitoring occupant setpoint changes over a time period. The occupant setpoint changes indicate that one or more conditions of the space result in occupant discomfort, according to some embodiments.

In some embodiments, obtaining the occupant comfort data includes generating an experimental setpoint. Obtaining the occupant comfort data includes operating the building equipment to drive one or more conditions of the space to the experimental setpoint, according to some embodiments. Obtaining the occupant comfort data includes surveying an occupant of the space for the level of occupant comfort, according to some embodiments.

In some embodiments, obtaining the occupant comfort data includes receiving votes from an occupant over the time period regarding a level of occupant comfort.

In some embodiments, obtaining the occupant comfort data includes monitoring an occupant for one or more visible indications of the level of occupant comfort based on information received from a visual detection device. The occupant comfort model is generated based on the one or more visible indications of the level of occupant comfort, according to some embodiments.

Another implementation of the present disclosure is an environmental control system for maintaining occupant comfort in a space of a building, according to some embodiments. The environmental control system includes building equipment operable to affect a variable state or condition of the space, according to some embodiments. The environmental control system includes one or more environmental sensors configured to collect building data, according to some embodiments. The environmental control system includes a controller, according to some embodiments. The controller includes a processing circuit, according to some embodiments. The processing circuit is configured to receive the building data from the one or more environmental sensors, according to some embodiments. The processing circuit is configured to obtain occupant comfort data, according to some embodiments. The processing circuit is configured to generate an occupant comfort model by training a neural network with the building data and the occupant comfort data, according to some embodiments. The occupant comfort model relates the building data to a level of occupant comfort within the space, according to some embodiments. The processing circuit is configured to generate time-varying comfort constraints for an environmental condition of the space using the occupant comfort model, according to some embodiments. The processing circuit is configured to perform a cost optimization of a cost function of operating the building equipment over a time duration to determine a setpoint for the building equipment, according to some embodiments. The cost optimization is performed subject to the time-varying comfort constraints, according to some embodiments. The processing circuit is configured operate the building equipment based on the setpoint to affect the variable state or condition of the space to maintain the occupant comfort in the space, according to some embodiments.

In some embodiments, the processing circuit is configured to update the occupant comfort model in response to obtaining additional occupant comfort data.

In some embodiments, the time-varying comfort constraints define a temperature setpoint range for the space.

In some embodiments, obtaining the occupant comfort data includes monitoring occupant setpoint changes over a time period. The occupant setpoint changes indicate that one or more conditions of the space result in occupant discomfort, according to some embodiments.

In some embodiments, obtaining the occupant comfort data includes generating an experimental setpoint. Obtaining the occupant comfort data includes operating the building equipment to drive one or more conditions of the space to the experimental setpoint, according to some embodiments. Obtaining the occupant comfort data includes surveying an occupant of the space for the level of occupant comfort, according to some embodiments.

In some embodiments, obtaining the occupant comfort data includes receiving votes from an occupant over a time period regarding the level of occupant comfort.

In some embodiments, the environmental control system includes a visual detection device. The processing circuit is configured to monitor an occupant for one or more visible indications of the level of occupant comfort based on information received from the visual detection device, according to some embodiments. The processing circuit is configured to generate the occupant comfort model based on the one or more visible indications of the level of occupant comfort, according to some embodiments.

Another implementation of the present disclosure is a method for maintaining occupant comfort in a space of a building, according to some embodiments. The method includes obtaining an occupant comfort model, according to some embodiments. The occupant comfort model is a neural network that relates building data to a level of occupant comfort within the space, according to some embodiments. The method includes generating time-varying comfort constraints for an environmental condition of the space using the occupant comfort model, according to some embodiments. The method includes performing a cost optimization of a cost function of operating building equipment over a time duration to determine a setpoint for building equipment, according to some embodiments. The cost optimization is performed subject the time-varying comfort constraints, according to some embodiments. The method includes operating the building equipment based on the setpoint to affect a variable state or condition of the space to maintain the occupant comfort in the space, according to some embodiments.

In some embodiments, the method includes determining whether the occupant comfort model requires updating. The method includes updating the occupant comfort model in response to determining the occupant comfort model requires updating, according to some embodiments.

In some embodiments, the comfort constraint defines a temperature setpoint range for the space. A minimum value and a maximum value of the temperature setpoint range are at least 2 degrees Celsius apart, according to some embodiments.

In some embodiments, the time-varying comfort constraints are ranges of values of the environmental condition that maintains the occupant comfort in the space.

In some embodiments, the occupant comfort model is updated based on a determination that an occupant is uncomfortable in the space.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
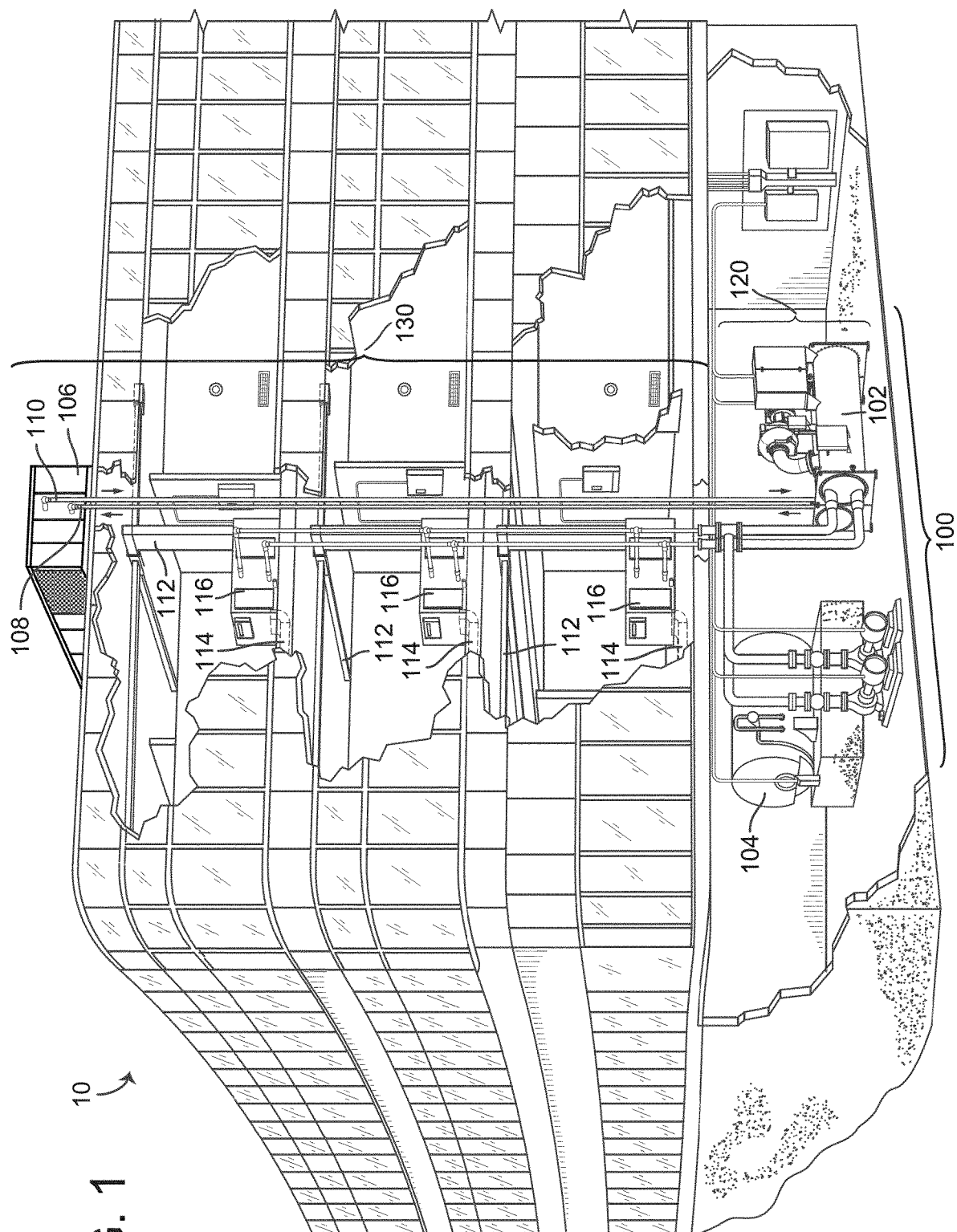
FIG. 1 is a drawing of a building equipped with a HVAC system, according to some embodiments.

Referring generally to the FIGURES, systems and methods for comfort management for a building are shown, according to various exemplary embodiments. Comfort management in a building allows building devices to maintain an acceptable value of one or more environmental conditions in the building (e.g., temperature, humidity, air quality, etc.) based on occupant preferences and occupancy schedules. The acceptable value indicates a value of an environmental condition that is appropriate based on a state of a space. For example, if the space is occupied, the acceptable value can be a value that is comfortable for occupants of the space. However, for example, if the space is not occupied, the acceptable value can be a value that is uncomfortable for occupants as to reduce energy costs. Throughout a time period, the acceptable value of the one or more environmental conditions may change. This change may occur, for example, due to external weather conditions, a time of day, a day of the week, varying occupant preferences, and occupancy schedules. In an optimal situation, proper comfort management can reduce and/or eliminate occupant interaction with the building devices. If comfort management is properly implemented, spaces in the building may be automatically controlled to achieve comfortable conditions when occupied, eliminating the need for manual adjustments.

The present disclosure illustrates how occupant comfort can be modeled in a space of a building. For example, the systems and methods for comfort management in the present disclosure can be implemented using an artificial neural network (ANN). The ANN allows an occupant comfort model to be generated indicating how occupants may perceive environmental conditions in the building and possible changes to said environmental conditions. However, generating the occupant comfort model may require significant amounts of data to accurately reflect how occupants respond to environmental conditions and whether or not the occupants deem certain environmental conditions comfortable or not. Prior to obtaining the data necessary to properly generate the occupant comfort model, assumptions on what is generally considered comfortable may need to be made. For example, one assumption that can be made is that a comfortable room temperature is around 23-degrees Celsius.

Occupant comfort for various environmental conditions can be gathered in multiple ways. One way of gathering occupant comfort data can be through performing experiments on a setpoint of an environmental condition and surveying occupants for an occupant comfort level during an experiment. Another way of gathering occupant comfort data can be through polling occupants throughout a time period to rate their comfort level and adjusting setpoints based on rated comfort levels. Another way of gathering occupant comfort data can be through monitoring occupant setpoint adjustments to determine how frequently occupants make adjustments to setpoints and a magnitude of change of each adjustment. Based on occupant setpoint adjustments, a comfort level of occupants can be determined as comfort data. Yet another way of gathering occupant comfort data can be through utilization of video cameras to monitor user reactions to current environmental conditions (e.g., a person with a red face may be cold). As time progress, the occupant comfort model can be updated and/or a new occupant comfort model can be generated to reflect updated information regarding occupant preferences, external weather conditions, etc.

Building HVAC Systems and Building Management Systems

Figure 2:
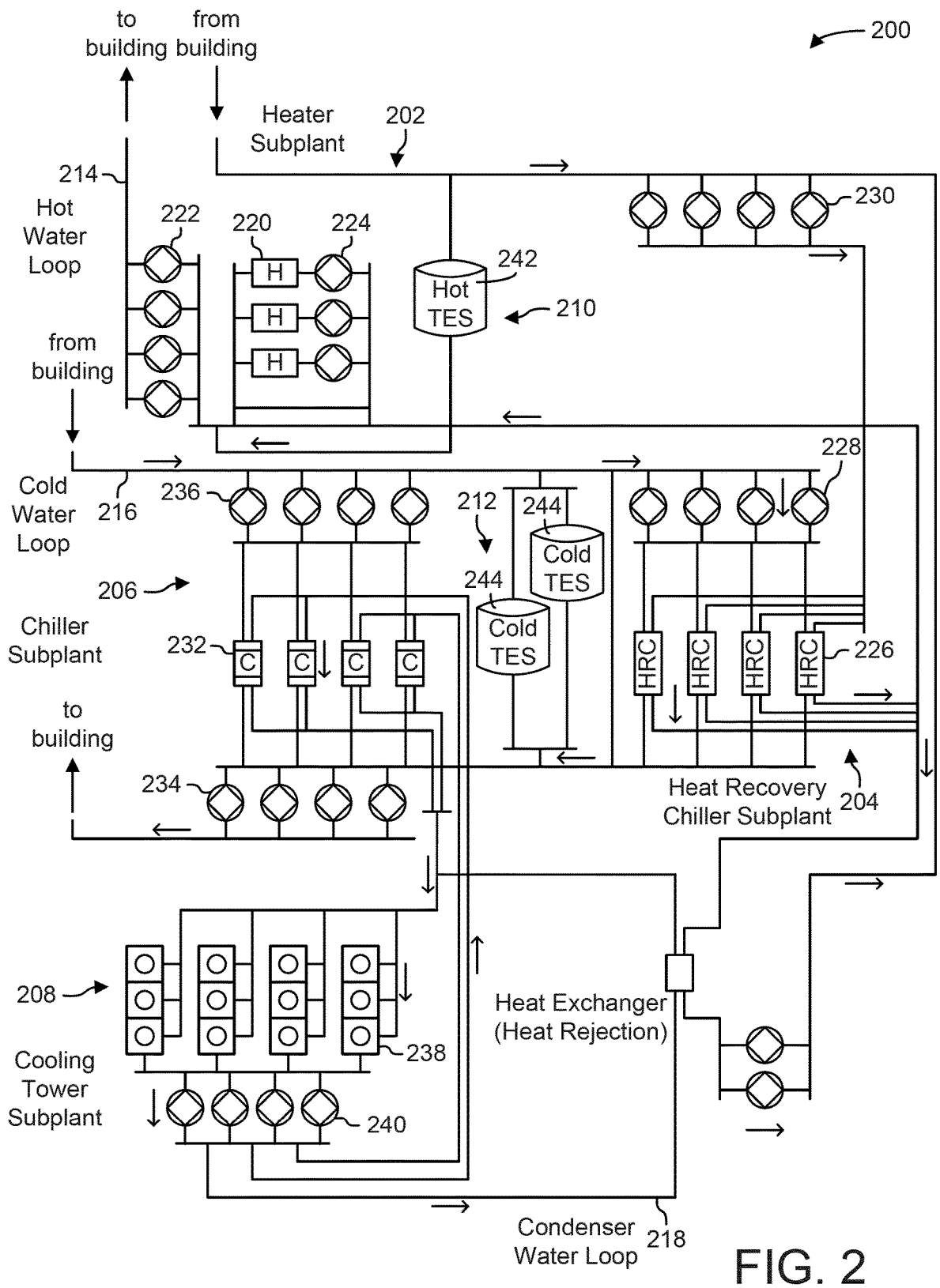
FIG. 2 is a block diagram of a waterside system which can be used to serve the heating or cooling loads of the building of FIG. 1, according to some embodiments.
Figure 3:
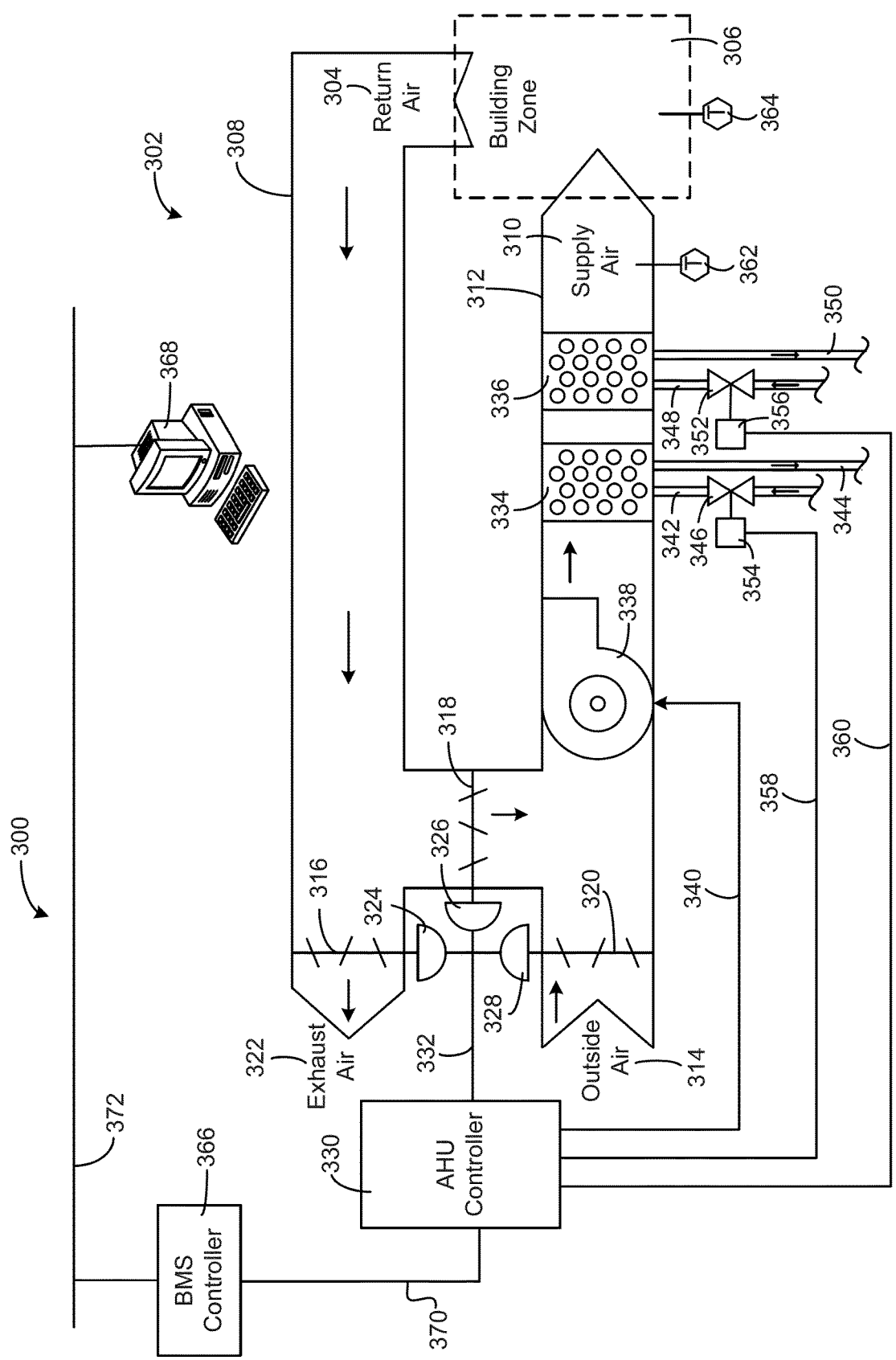
FIG. 3 is a block diagram of an airside system which can be used to serve the heating or cooling loads of the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a variable refrigerant flow (VRF) system which can be used to serve building 10. FIG. 5 is a block diagram of another VRF system which can be used to serve building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils).

The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Variable Refrigerant Flow Systems

Figure 4A:
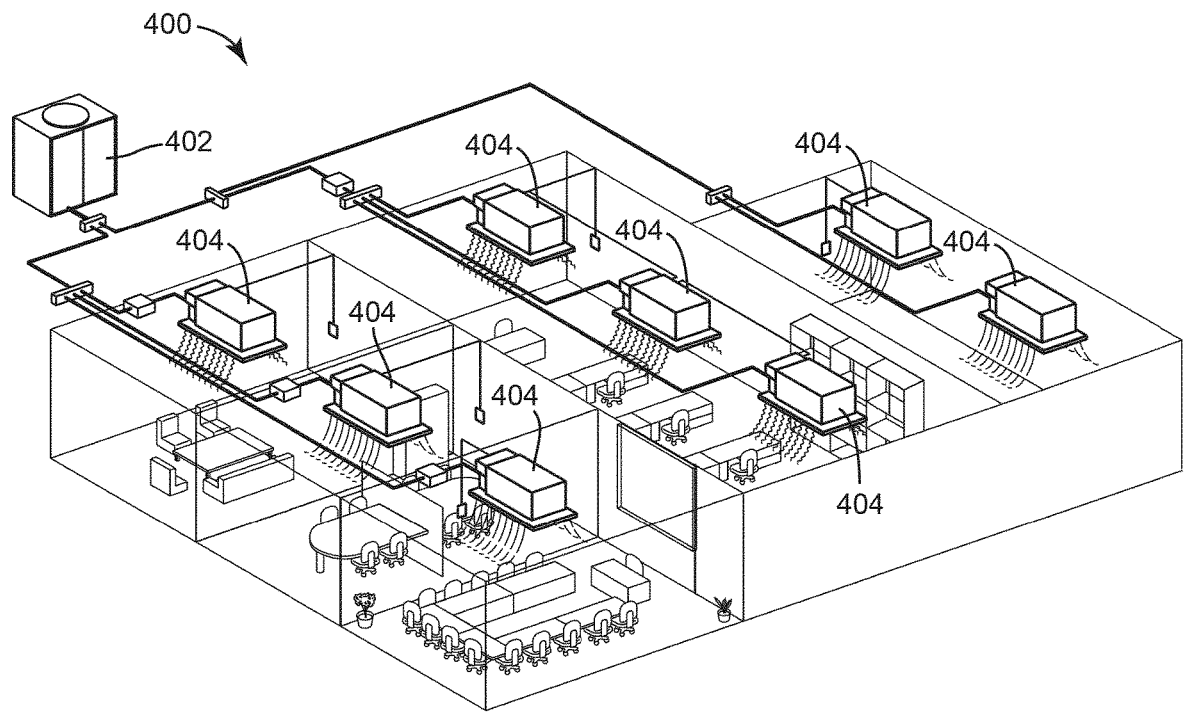
FIGS. 4A-4B are drawings of a variable refrigerant flow (VRF) system having one or more outdoor VRF units and a plurality of indoor VRF units, according to some embodiments.
Figure 4B:
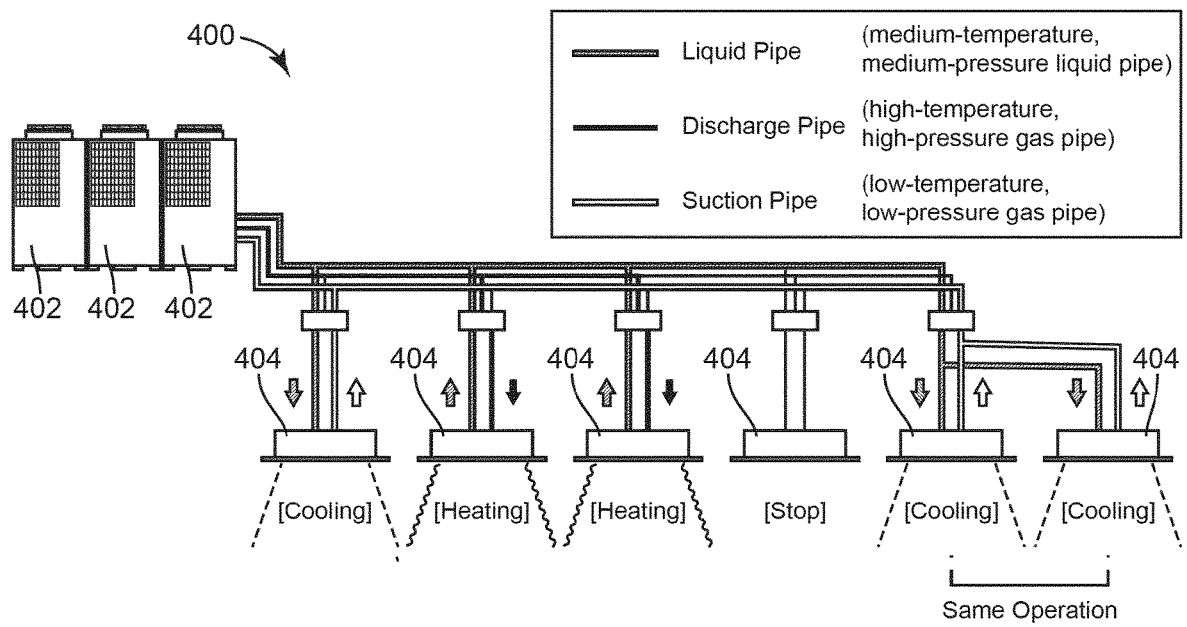
Figure 5:
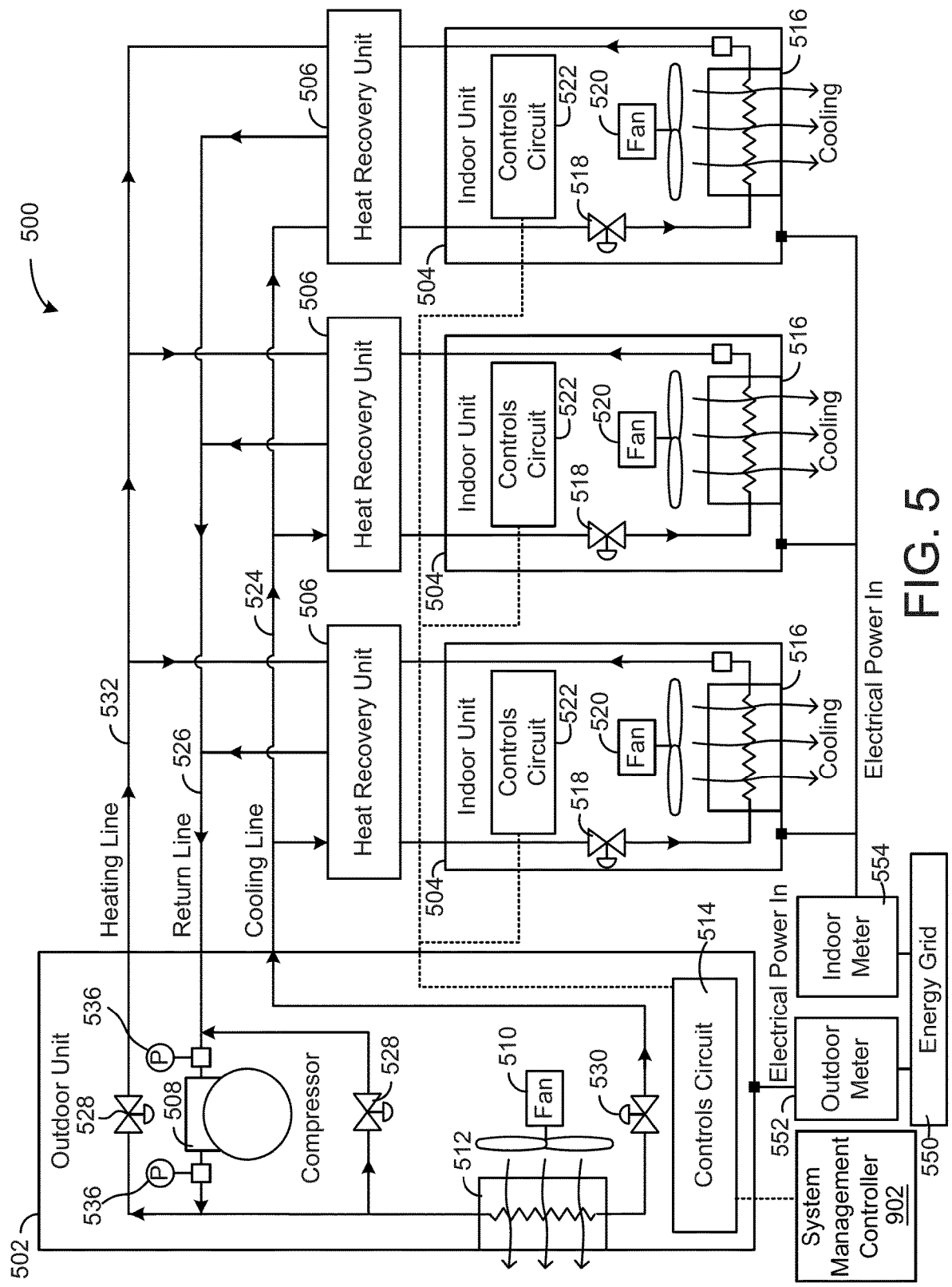
FIG. 5 is a block diagram of a VRF system having one or more outdoor VRF units and multiple indoor VRF units, according to some embodiments.

Referring now to FIGS. 4A-4B, a variable refrigerant flow (VRF) system 400 is shown, according to some embodiments. VRF system 400 is shown to include a plurality of outdoor VRF units 402 and a plurality of indoor VRF units 404. Outdoor VRF units 402 can be located outside a building and can operate to heat or cool a refrigerant. Outdoor VRF units 402 can consume electricity to convert refrigerant between liquid, gas, and/or super-heated gas phases. Indoor VRF units 404 can be distributed throughout various building zones within a building and can receive the heated or cooled refrigerant from outdoor VRF units 402. Each indoor VRF unit 404 can provide temperature control for the particular building zone in which the indoor VRF unit is located.

A primary advantage of VRF systems is that some indoor VRF units 404 can operate in a cooling mode while other indoor VRF units 404 operate in a heating mode. For example, each of outdoor VRF units 402 and indoor VRF units 404 can operate in a heating mode, a cooling mode, or an off mode. Each building zone can be controlled independently and can have different temperature setpoints. In some embodiments, each building has up to three outdoor VRF units 402 located outside the building (e.g., on a rooftop) and up to 128 indoor VRF units 404 distributed throughout the building (e.g., in various building zones).

Many different configurations exist for VRF system 400. In some embodiments, VRF system 400 is a two-pipe system in which each outdoor VRF unit 402 connects to a single refrigerant return line and a single refrigerant outlet line. In a two-pipe system, all of the outdoor VRF units 402 operate in the same mode since only one of a heated or chilled refrigerant can be provided via the single refrigerant outlet line. In other embodiments, VRF system 400 is a three-pipe system in which each outdoor VRF unit 402 connects to a refrigerant return line, a hot refrigerant outlet line, and a cold refrigerant outlet line. In a three-pipe system, both heating and cooling can be provided simultaneously via dual refrigerant outlet lines.

Referring now to FIG. 5, a block diagram illustrating a VRF system 500 is shown, according to some embodiments. VRF system 500 is shown to include outdoor VRF unit 502, several heat recovery units 506, and several indoor VRF units 504. Outdoor VRF unit 502 may include a compressor 508, a fan 510, or other power-consuming refrigeration components configured convert a refrigerant between liquid, gas, and/or super-heated gas phases. Indoor VRF units 504 can be distributed throughout various building zones within a building and can receive the heated or cooled refrigerant from outdoor VRF unit 502. Each indoor VRF unit 504 can provide temperature control for the particular building zone in which the indoor VRF unit 504 is located. Heat recovery units 506 can control the flow of a refrigerant between outdoor VRF unit 502 and indoor VRF units 504 (e.g., by opening or closing valves) and can minimize the heating or cooling load to be served by outdoor VRF unit 502.

Outdoor VRF unit 502 is shown to include a compressor 508 and a heat exchanger 512. Compressor 508 circulates a refrigerant between heat exchanger 512 and indoor VRF units 504. Compressor 508 operates at a variable frequency as controlled by outdoor unit controls circuit 514. At higher frequencies, compressor 508 provides indoor VRF units 504 with greater heat transfer capacity. Electrical power consumption of compressor 508 increases proportionally with compressor frequency.

Heat exchanger 512 can function as a condenser (allowing the refrigerant to reject heat to the outside air) when VRF system 500 operates in a cooling mode or as an evaporator (allowing the refrigerant to absorb heat from the outside air) when VRF system 500 operates in a heating mode. Fan 510 provides airflow through heat exchanger 512. The speed of fan 510 can be adjusted (e.g., by outdoor unit controls circuit 514) to modulate the rate of heat transfer into or out of the refrigerant in heat exchanger 512.

Each indoor VRF unit 504 is shown to include a heat exchanger 516 and an expansion valve 518. Each of heat exchangers 516 can function as a condenser (allowing the refrigerant to reject heat to the air within the room or zone) when indoor VRF unit 504 operates in a heating mode or as an evaporator (allowing the refrigerant to absorb heat from the air within the room or zone) when indoor VRF unit 504 operates in a cooling mode. Fans 520 provide airflow through heat exchangers 516. The speeds of fans 520 can be adjusted (e.g., by indoor unit controls circuits 522) to modulate the rate of heat transfer into or out of the refrigerant in heat exchangers 516.

In FIG. 5, indoor VRF units 504 are shown operating in the cooling mode. In the cooling mode, the refrigerant is provided to indoor VRF units 504 via cooling line 524. The refrigerant is expanded by expansion valves 518 to a cold, low pressure state and flows through heat exchangers 516 (functioning as evaporators) to absorb heat from the room or zone within the building. The heated refrigerant then flows back to outdoor VRF unit 502 via return line 526 and is compressed by compressor 508 to a hot, high pressure state. The compressed refrigerant flows through heat exchanger 512 (functioning as a condenser) and rejects heat to the outside air. The cooled refrigerant can then be provided back to indoor VRF units 504 via cooling line 524. In the cooling mode, flow control valves 528 can be closed and expansion valve 530 can be completely open.

In the heating mode, the refrigerant is provided to indoor VRF units 504 in a hot state via heating line 532. The hot refrigerant flows through heat exchangers 516 (functioning as condensers) and rejects heat to the air within the room or zone of the building. The refrigerant then flows back to outdoor VRF unit via cooling line 524 (opposite the flow direction shown in FIG. 5). The refrigerant can be expanded by expansion valve 530 to a colder, lower pressure state. The expanded refrigerant flows through heat exchanger 512 (functioning as an evaporator) and absorbs heat from the outside air. The heated refrigerant can be compressed by compressor 508 and provided back to indoor VRF units 504 via heating line 532 in a hot, compressed state. In the heating mode, flow control valves 528 can be completely open to allow the refrigerant from compressor 508 to flow into heating line 532.

As shown in FIG. 5, each indoor VRF unit 504 includes an indoor unit controls circuit 522. Indoor unit controls circuit 522 controls the operation of components of indoor VRF unit 504, including fan 520 and expansion valve 518, in response to a building zone temperature setpoint or other request to provide heating/cooling to the building zone. For example, indoor unit controls circuit 522 can generate a signal to turn fan 520 on and off. Indoor unit controls circuit 522 also determines a heat transfer capacity required by indoor VRF unit 504 and a frequency of compressor 508 that corresponds to that capacity. When indoor unit controls circuit 522 determines that indoor VRF unit 504 must provide heating or cooling of a certain capacity, indoor unit controls circuit 522 then generates and transmits a compressor frequency request to outdoor unit controls circuit 514 including the compressor frequency corresponding to the required capacity.

Outdoor unit controls circuit 514 receives compressor frequency requests from one or more indoor unit controls circuits 522 and aggregates the requests, for example by summing the compressor frequency requests into a compressor total frequency. In some embodiments, the compressor frequency has an upper limit, such that the compressor total frequency cannot exceed the upper limit. Outdoor unit controls circuit 514 supplies the compressor total frequency to the compressor, for example as an input frequency given to a DC inverter compressor motor of the compressor. Indoor unit controls circuits 522 and outdoor unit controls circuit 514 thereby combine to modulate the compressor frequency to match heating/cooling demand. Outdoor unit controls circuit 514 may also generate signals to control valve positions of flow control valves 528 and expansion valve 530, a compressor power setpoint, a refrigerant flow setpoint, a refrigerant pressure setpoint (e.g., a differential pressure setpoint for the pressure measured by pressure sensors 536), on/off commands, staging commands, or other signals that affect the operation of compressor 508, as well as control signals provided to fan 510 including a fan speed setpoint, a fan power setpoint, an airflow setpoint, on/off commands, or other signals that affect the operation of fan 510.

Indoor unit controls circuits 522 and outdoor unit controls circuit 514 may store and/or provide a data history of one or more control signals generated by or provided to controls circuits 514, 522. For example, indoor unit controls circuits 522 may store and/or provide a log of generated compressor request frequencies, fan on/off times, and indoor VRF unit 504 on/off times. Outdoor unit controls circuit 514 may store and/or provide a log of compressor request frequencies and/or compressor total frequencies and compressor runtimes.

VRF system 500 is shown as running on electrical power provided by an energy grid 550 via an outdoor meter 552 and an indoor meter 554. According to various embodiments, energy grid 550 is any supply of electricity, for example an electrical grid maintained by a utility company and supplied with power by one or more power plants. Outdoor meter 552 measures the electrical power consumption over time of outdoor VRF unit 502, for example in kilowatt-hours (kWh). Indoor meter 554 measures the electrical power consumption over time of indoor VRF units 504, for example in kWh. VRF system 500 incurs energy consumption costs based on the metered electrical power consumption of outdoor meter 552 and/or indoor meter 554, as billed by the utility company that provides the electrical power. The price of electrical power (e.g., dollars per kWh) may vary over time.

VRF system 500 also includes a system management controller 902. As described in detail below with reference to FIGS. 9-12, system management controller 902 is configured to minimize energy consumption costs for VRF system 500 while also maintaining occupant comfort.

Window Air Conditioner

Figure 6:
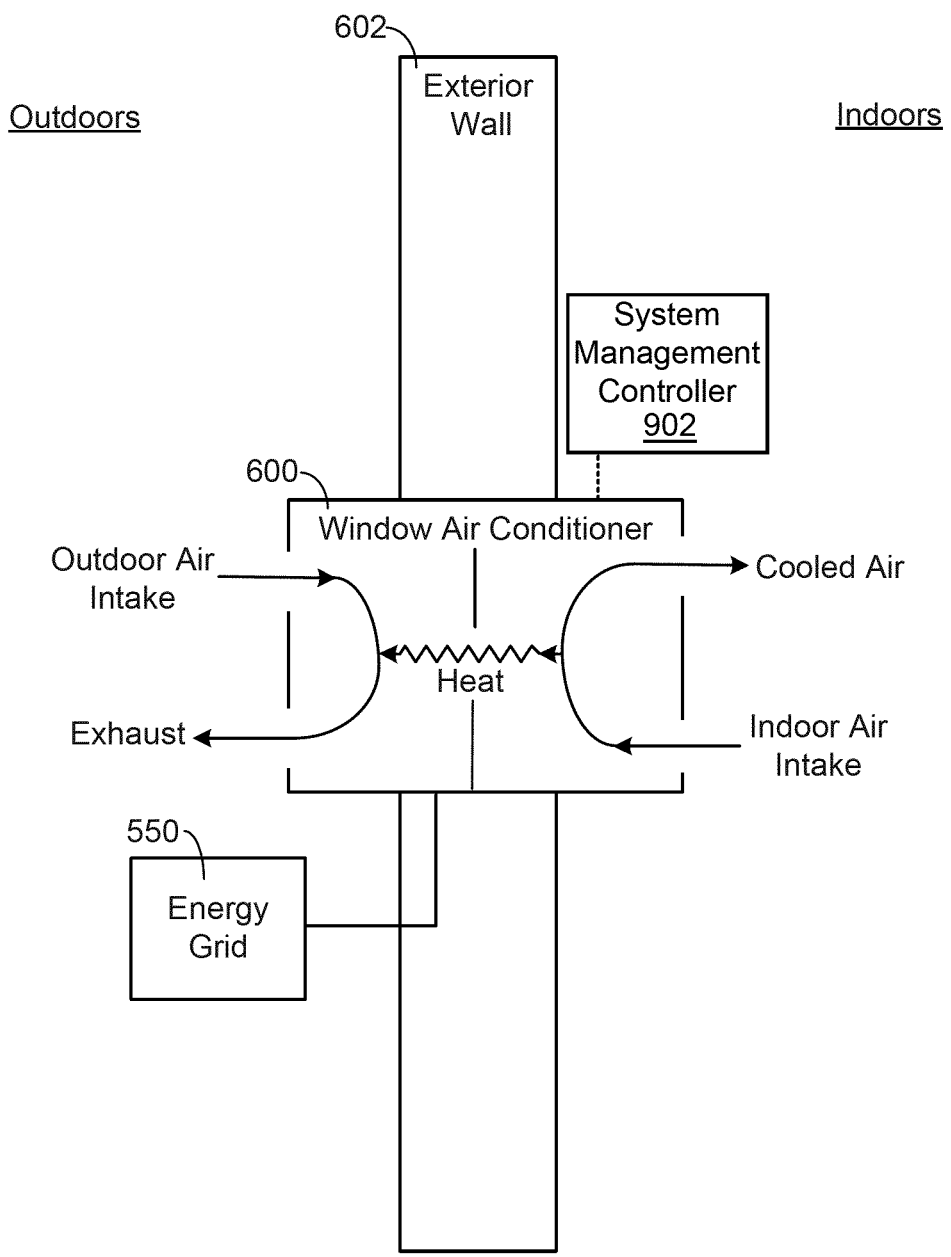
FIG. 6 is a block diagram of a window air conditioner, according to some embodiments.

Referring now to FIG. 6, a window air conditioner 600 is shown, according to an exemplary embodiment. Window air conditioner 600 is configured to be mounted in a window of a building, such that window air conditioner 600 extends across an exterior wall 602 of the building. Window air conditioner 600 can thereby provide airflow to and/or receive air from both indoors (i.e., inside a building) and outdoors (i.e., outside of a building). A window air conditioner 600 is sometimes also referred to as a room air conditioner.

Window air conditioner 600 acts as a heat pump to transfer heat from the indoor air to the outdoor air. As shown in FIG. 6, window air conditioner 600 intakes indoor air and outputs cooled air into the room. Window air conditioner 600 also intakes outdoor air and outputs exhaust outside of the building. Window air conditioner 600 may include a compressor, a condenser, an evaporator, and one or more fans to facilitate the transfer of heat across exterior wall 602 (i.e., from indoors to outdoors). Window air conditioner 600 is thereby configured to cause the temperature of the indoor air to decrease towards a temperature setpoint.

Window air conditioner 600 consumes electrical power from energy grid 550 when operating to transfer heat across exterior wall 602. Window air conditioner 600 may be controllable to operate at various powers to provide various levels of cooling to the building, for example based on a temperature setpoint. Window air conditioner 600 may also turn on and off as needed. Window air conditioner 600 therefore consumes more electrical power when providing more cooling and less electrical power when providing less cooling.

In some embodiments, system management controller 902 is communicably coupled to window air conditioner 600 to provide control signals for window air conditioner 600 and to received data from window air conditioner 600. For example, system management controller 902 may provide a temperature setpoint to window air conditioner 600. System management controller 902 is described in detail with reference to FIGS. 9-12. In some embodiments, system management controller 902 is integrated into window air conditioner 600. In some embodiments, system management controller 902 operates remotely (e.g., on cloud server) and/or serves multiple window air conditioners 600.

Room Air Conditioning System

Figure 7:
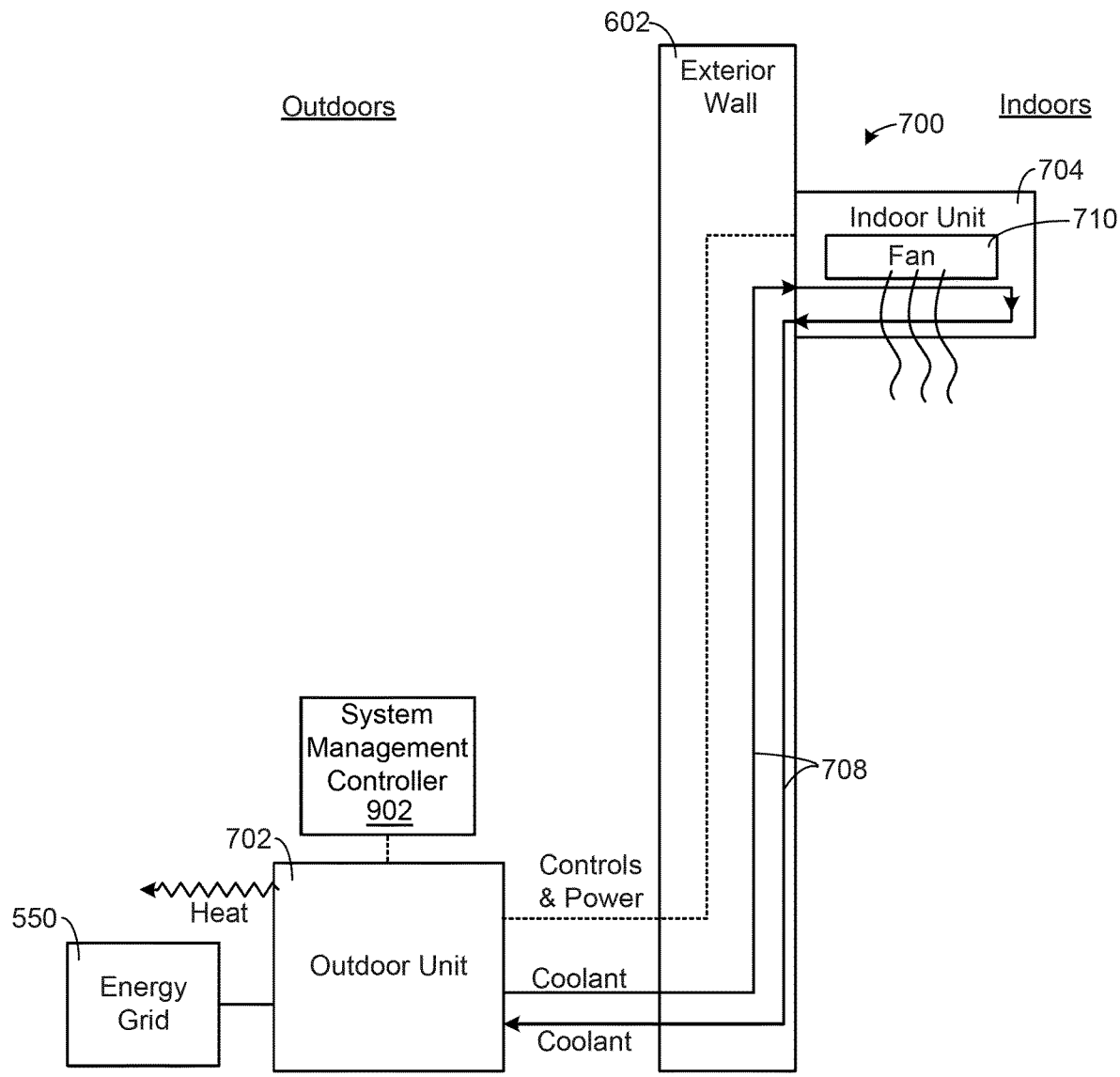
FIG. 7 is a block diagram of a room air conditioning system, according to some embodiments.

Referring now to FIG. 7, a room air conditioning system 700 is shown, according to an exemplary embodiment. Room air conditioning system 700 provides cooling for a room of a building. Room air conditioning system 700 includes in outdoor unit 702 and an indoor unit 704. Outdoor unit 702 is located outside of the building while indoor unit 704 is located inside of the building, such that indoor unit 704 is separated from outdoor unit 702 by an exterior wall 602 of the building. Indoor unit 704 may be mounted on an indoor surface of exterior wall 602. Indoor unit 704 and outdoor unit 702 are communicably coupled to exchange control signals and data, according to some embodiments. Indoor unit 704 may also receive electrical power via outdoor unit 702, or vice versa.

Outdoor unit 702 consumes electrical power from energy grid 550 to cool a coolant. The coolant is then forced through pipe 708, which runs through exterior wall 602 from outdoor unit 702 to indoor unit 704. A fan 710 blows air from the room across pipe 708 to transfer heat from the room to the coolant. The coolant then flows back to outdoor unit 702 where it is re-cooled for circulation back to indoor unit 704. Room air conditioning system 700 thereby operates to transfer heat across exterior wall 602 from indoors to outdoors.

Outdoor unit 702 and indoor unit 704 may be controlled to track a temperature setpoint for the room. For example, outdoor unit 702 may be controlled to run at various powers to provide variable rates of coolant flow and/or various coolant temperatures to indoor unit 704. Fan 710 in the may be controlled to operate at various speeds. Room air conditioning system 700 is also controllable to turn on and off as needed. Accordingly, room air conditioning system 700 consumes more electrical power from energy grid 550 when it provides more cooling to the room.

In some embodiments, system management controller 902 is communicably coupled to outdoor unit 702 and/or indoor unit 704 to provide control signals for room air conditioning system 700 and to receive data from room air conditioning system 700. For example, system management controller 902 may provide a temperature setpoint to room air conditioning system 700. System management controller 902 is described in detail with reference to FIGS. 9-12. In some embodiments, system management controller 902 is integrated into outdoor unit 702 and/or indoor unit 704. In some embodiments, system management controller 902 operates remotely (e.g., on cloud server) and/or serves multiple room air conditioning systems 700.

Packaged Air Conditioner

Figure 8:
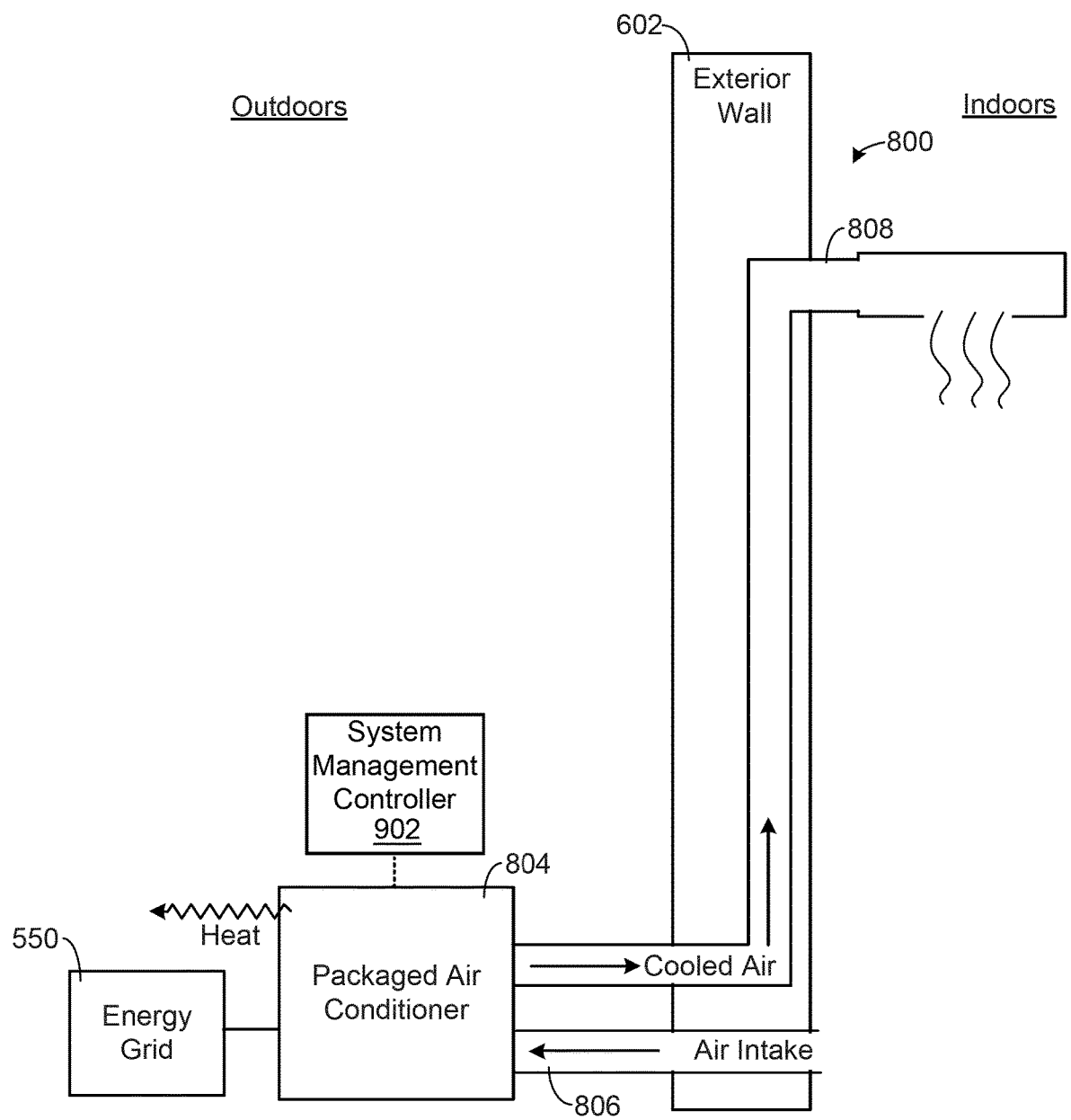
FIG. 8 is a block diagram of a packaged air conditioner system, ac according to some embodiments.

Referring now to FIG. 8, a packaged air conditioner system 800 is shown, according to an exemplary embodiment. Packaged air conditioner system 800 includes a packaged air conditioner 804, an air intake vent 806, and a cooled air duct 808. Packaged air conditioner 804 is located outdoors while air intake vent 806 and cooled air duct 808 extend from packaged air conditioner 804 through exterior wall 602 of a building to allow air to flow between packaged air conditioner 804 and the inside of the building.

Packaged air conditioner system 800 consumes electrical power from energy grid 550 to draw in indoor air from inside the building through air intake vent 806, remove heat from the indoor air to cool the air, and provide the cooled air to cooled air duct 808. Packaged air conditioner system 800 expels the heat to the outdoor air. Cooled air duct 808 allows the cooled air to flow across exterior wall 602 and into the air in the building to lower the indoor air temperature of the building.

Packaged air conditioner 804 may be controlled to track a temperature setpoint for the building. For example, packaged air conditioner 804 may be operated at various powers to provide various temperatures of cooled air and/or various flow rates of cooled air to cooled air duct 808. Packaged air conditioner 804 consumes more electrical power from energy grid 550 when it provides more cooling to the room, by operating at a higher rate of power consumption and/or by operating for more time.

System management controller 902 is communicably coupled to packaged air conditioner 804 to provide control signals for room air conditioning system 700 and to receive data from packaged air conditioner 804. For example, system management controller 902 may provide a temperature setpoint to packaged air conditioner 804. System management controller 902 is described in detail with reference to FIGS. 9-12. In some embodiments, system management controller 902 is integrated into packaged air conditioner 804. In some embodiments, system management controller 902 operates remotely (e.g., on cloud server) and/or serves multiple room air conditioning systems 700.

Comfort Management System

Figure 9:
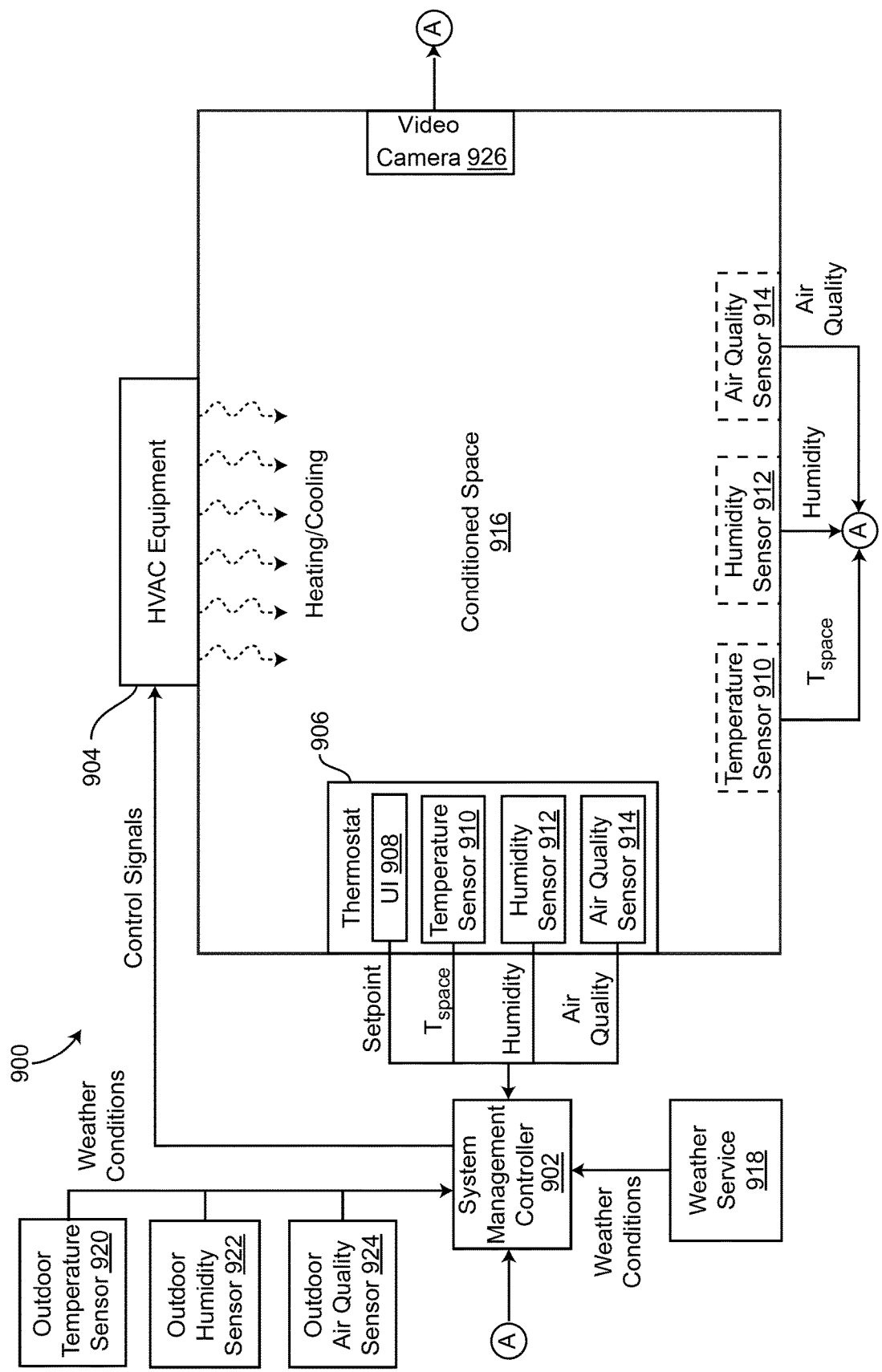
FIG. 9 is a block diagram of a comfort management system, according to some embodiments.

Referring now to FIG. 9, a comfort management system 900 is shown, according to some embodiments. Comfort management system 900 is shown to include system management controller 902. System management controller 902 can be configured to gather information regarding various conditions in comfort management system 900 and output control signals to HVAC equipment 904. In some embodiments, system management controller 902 is configured to operate HVAC equipment 904 to maintain an appropriate level of comfort in a conditioned space 916. HVAC equipment 904 can be configured to provide heating/cooling to conditioned space 916. HVAC equipment 904 may include any of the HVAC devices described with reference to FIGS. 1-8. Conditioned space 916 may be, for example, a room in building 10, a zone of building 10, or any other area in building 10 that requires an appropriate comfort level to be maintained. In some embodiments, system management controller 902 determines optimal setpoints for conditioned space 916 to ensure occupants are comfortable. Optimal setpoints can include, for example, a target temperature for conditioned space 916, a target humidity value, etc. System management controller 902 can be configured to maintain an appropriate level of comfort while reducing resource consumption (e.g., power) in comfort management system 900. To achieve a balance between comfort and resource consumption, system management controller 902 can determine a comfort range, such that actual values (e.g., the temperature, the humidity, etc.) can vary within the comfort range. By determining a comfort range, system management controller 902 can reduce resource consumption while also providing a comfortable environment for occupants. In some embodiments, system management controller 902 is part of building 10. In some embodiments, system management controller 902 is hosted externally (e.g., on a cloud-based service).

In some embodiments, system management controller 902 utilizes various sensors and services in comfort management system 900 to determine optimal setpoints or setpoint bounds for conditioned space 916. The various sensors and services can include any sensor or service that can provide conditions of conditioned space 916 or outdoor conditions to system management controller 902 as building data. Conditions of conditioned space 916 (or any space) can include, for example, measurable environmental conditions (e.g., temperature, humidity, carbon dioxide, occupancy, etc.), setpoints for conditioned space 916 (e.g., particular setpoints or setpoint ranges), and/or control actions taken with respect to conditioned space 916 (e.g., heating enabled, cooling enabled, etc.). Based on the building data including the conditions of conditioned space 916, system management controller 902 can generate control decisions regarding how to operate building equipment (e.g., HVAC equipment 904) of conditioned space 916, such that the building equipment can affect a variable state or condition (e.g., an environmental condition) of conditioned space 916.

Comfort management system 900 is shown to include an outdoor temperature sensor 920. In some embodiments, outdoor temperature sensor 920 is outside of conditioned space 916. Outdoor temperature sensor 920 can be configured to measure and provide outdoor temperature conditions to system management controller 902. The outdoor temperature conditions can be used by system management controller 902 to estimate an external heat disturbance that can affect comfort values in conditioned space 916. For example, if outdoor temperature sensor 920 provides outdoor temperature conditions to system management controller 902 indicating it is very hot outside, system management controller 902 may determine that additional cooling will need to be performed on conditioned space 916 to maintain an appropriate comfort range. As another example, if outdoor temperature sensor 920 provides outdoor temperature conditions to system management controller 902 indicating a temperature outside is already comfortable, additional heating/cooling may not be required to maintain comfort in conditioned space 916. However, heating/cooling may still be required in conditioned space 916 even if the temperature outside is comfortable. For example, heat emitted by people, electronic devices, etc. inside conditioned space 916 may increase a temperature of conditioned space 916 beyond a comfortable range such that additional cooling may be required even if the temperature outside is comfortable.

Comfort management system 900 is also shown to include an outdoor humidity sensor 922. Similar to outdoor temperature sensor 920, outdoor humidity sensor 922 may be outside of conditioned space 916. In some embodiments, outdoor humidity sensor 922 measures and provides outdoor humidity conditions to system management controller 902. System management controller 902 can use the outdoor humidity conditions to determine how to manage humidity in conditioned space 916 to maintain appropriate comfort values. For example, if the outdoor comfort conditions provided to system management controller 902 by outdoor humidity sensor 922 indicate a high outdoor humidity, system management controller 902 may determine that dehumidification is required to maintain comfort within conditioned space 916 and can provide control signals to HVAC equipment 904 to achieve the required dehumidification in conditioned space 916.

Comfort management system 900 is also shown to include an outdoor air quality sensor 924. Similar to outdoor temperature sensor 920, outdoor air quality sensor 924 may be outside of conditioned space 916. In some embodiments, outdoor air quality sensor 924 is configured to measure outdoor air quality conditions and provide the outdoor air quality conditions to system management controller 902. The outdoor air quality conditions can include, for example, carbon monoxide (CO) levels, airborne particulate matter levels (e.g., PM2.5, PM10, etc.), pollen levels, ground level ozone, etc. Based on the outdoor air quality conditions, system management controller 902 can determine how much adjustment is necessary to maintain comfort for occupants of conditioned space 916. For example, if the outdoor air quality conditions indicate there is a high amount of airborne particulate matter, system management controller 902 may determine additional air filtering is needed if air is being brought from outdoors to conditioned space 916. As another example, if system management controller 902 is configured to account for occupants of conditioned space 916 that are highly sensitive to air quality (e.g., allergies to pollen in outdoor air), system management controller 902 may additionally filter outdoor air provided to conditioned space 916 even if the outdoor air quality conditions indicate outdoor air quality is fair.

In some embodiments, weather conditions provided by outdoor temperature sensor 920, outdoor humidity sensor 922, and outdoor air quality sensor 924 (e.g., outdoor temperature conditions, outdoor humidity conditions, and outdoor air quality conditions) are provided to system management controller 902 separately. In some embodiments, the weather conditions are provided to system management controller 902 as a combined data set. Weather conditions can be communicated to system management controller 902 through wireless and/or wired communication data. For example, outdoor temperature sensor 920, outdoor humidity sensor 922, and/or outdoor air quality sensor 924 may support wireless communication with system management controller 902. Wireless communication can include, for example, Wi-Fi communication, Bluetooth communication, satellite communication, etc. As another example, outdoor temperature sensor 920, outdoor humidity sensor 922, and/or outdoor air quality sensor 924 may communicate with system management controller 902 via a wired connection. In some embodiments, multiple outdoor temperature sensors 920, multiple outdoor humidity sensors 922, and/or multiple outdoor air quality sensors 924 are used in comfort management system 900. In some embodiments, system management controller 902 receives measurements from each of the sensors and averages the sensor measurements (e.g., average all temperature measurements received from outdoor temperature sensors 920, average humidity measurements received from outdoor humidity sensors 922, etc.). Comfort management system 900 can also include any other outdoor sensors configured to measure various outdoor conditions relevant to occupant comfort.

Comfort management system 900 is shown to include a weather service 918. In some embodiments, weather service 918 provides weather conditions to system management controller 902. Weather service 918 can be, for example, a local weather radio station, an internet site, a weather television station, etc. The weather conditions provided by weather service 918 can include various current weather conditions such as, for example, a current outdoor temperature, a current humidity value, a current air quality value, etc. In some embodiments, system management controller 902 uses the weather conditions provided by weather service 918 to determine setpoints and control signals to provide to HVAC equipment 904 to maintain an appropriate comfort level in conditioned space 916. In some embodiments, weather service 918 provides future weather predictions to system management controller 902. Future weather predictions can allow system management controller 902 to determine setpoints and control signals to maintain a comfortable environment in conditioned space 916 regardless of external weather conditions. For example, if the future weather predictions provided to system management controller 902 by weather service 918 indicate a significant temperature drop at a future time, system management controller 902 may provide control signals to HVAC equipment 904 ahead of the future time to heat conditioned space 916 to prepare for the upcoming decrease in temperature. In some embodiments, weather service 918 communicates with system management controller 902 via wireless and/or wired communication mediums. In some embodiments, weather service 918 is configured to provide system management controller 902 with any of the outdoor conditions as measured by outdoor temperature sensor 920, outdoor humidity sensor 922, and/or outdoor air quality sensor 924. System management controller 902 can use the weather conditions provided by weather service 918 in place of or in addition to the weather conditions measured by sensors 920-924.

Conditioned space 916 is shown to include a thermostat 906. Thermostat 906 can provide various information regarding conditioned space 916 to system management controller 902. Thermostat 906 is shown to include a temperature sensor 910. In some embodiments, temperature sensor 910 is configured to measure and provide a temperature value $T_{space}$ of conditioned space 916 to system management controller 902. Thermostat 906 is also shown to include a humidity sensor 912. In some embodiments, humidity sensor 912 is configured to measure and provide a humidity value of conditioned space 916 to system management controller 902. Thermostat 906 is also shown to include an air quality sensor 914. In some embodiments, air quality sensor 914 is configured to measure and provide an air quality value of conditioned space 916 to system management controller 902. In some embodiments, temperature sensor 910, humidity sensor 912, and air quality sensor 914 may be similar to and/or the same as outdoor temperature sensor 920, outdoor humidity sensor 922, and outdoor air quality sensor 924 respectively. In some embodiments, temperature sensor 910, humidity sensor 912, and/or air quality sensor 914 are separate devices and are not a part of thermostat 906. If temperature sensor 910, humidity sensor 912, and/or air quality sensor 914 are separate devices, the separate devices may provide environmental information (e.g., temperature data, humidity data, and air quality data) regarding conditioned space 916 directly to system management controller 902.

Thermostat 906 is also shown to include a user interface (UI) 908. In some embodiments, UI 908 allows a user (e.g., an occupant of conditioned space 916) to manually designate setpoints for conditioned space 916. For example, if a user determines that conditioned space 916 is too warm, the user can change a temperature setpoint to a lower value via UI 908. As another example, if a user determines a humidity value in conditioned space 916 is too low, the user can change a humidity setpoint to a higher value via UI 908. In some embodiments, system management controller 902 can use setpoint changes made by a user to improve an estimation of an appropriate comfort range determined by system management controller 902. For example, if a user is frequently changing a temperature setpoint to a higher value, system management controller 902 may determine that the estimated appropriate comfort range is too low and can adjust accordingly. In some embodiments, setpoint changes made by a user via UI 908 override decisions made by system management controller 902. If the decisions made by system management controller 902 are overridden, system management controller 902 may provide control signals to HVAC equipment 904 to satisfy setpoints set by a user.

Conditioned space 916 is also shown to include a visual detection device, shown as video camera 926. In some embodiments, video camera 926 can record visual information regarding conditioned space 916. In particular, video camera 926 can record occupants in conditioned space 916 for visible indications of occupant comfort levels. In some embodiments, video camera 926 is a visible light camera. In some embodiments, video camera 926 is an infrared (IR) camera. In some embodiments, conditioned space 916 has multiple video cameras 926. Video camera 926 can be configured to provide video recordings to system management controller 902. In some embodiments, system management controller 902 can use the video recordings to determine a comfort level of an occupant based on visible indications of the occupant. For example, if video camera 926 is an IR camera, a low heat signature of an occupant may indicate the occupant is too cold.

Figure 10:
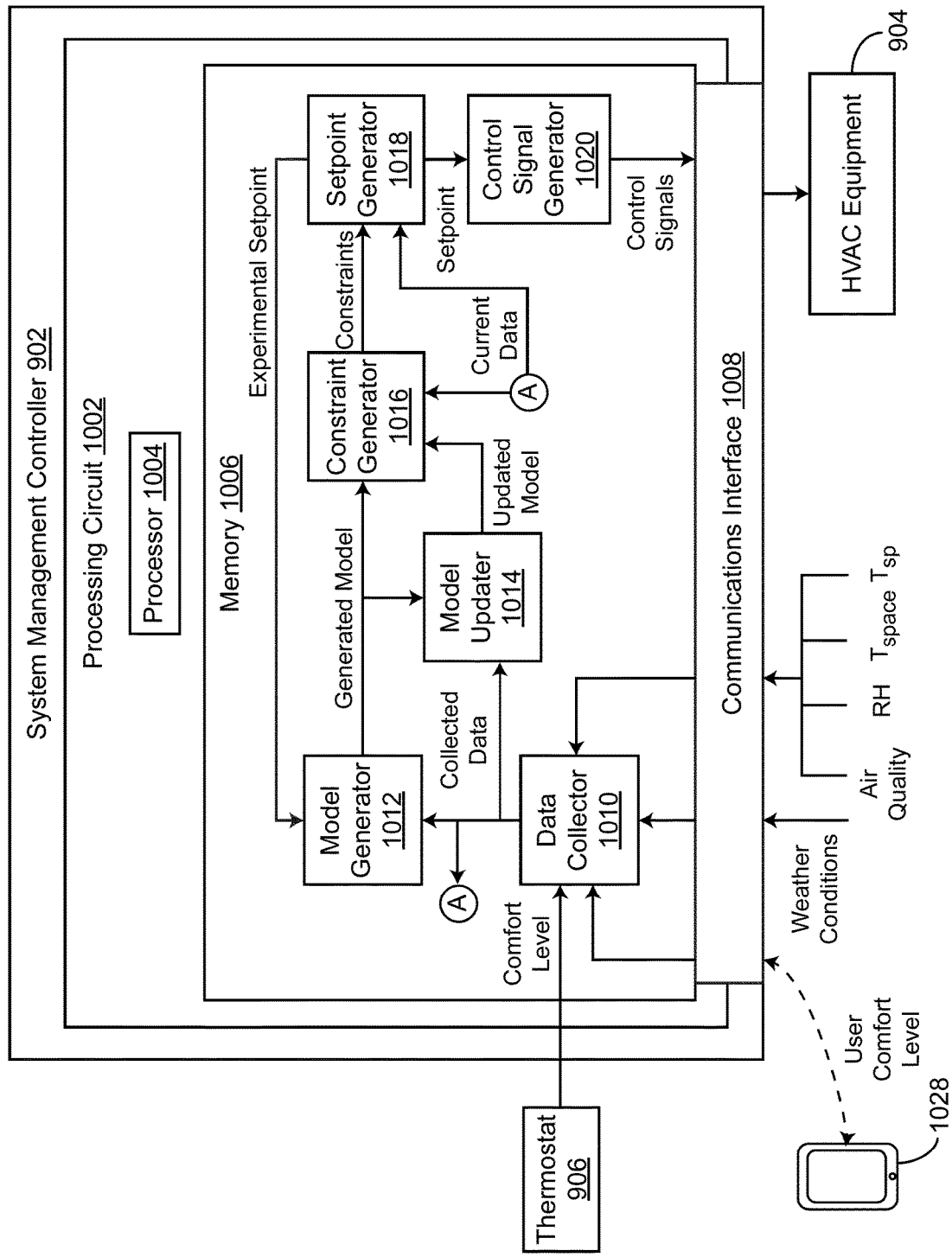
FIG. 10 is a block diagram of the system management controller of FIG. 9 in greater detail, according to some embodiments.

Referring now to FIG. 10, a block diagram of condition management system 900 showing system management controller 902 in greater detail is shown, according to some embodiments. In some embodiments, system management controller 902 is configured to utilize artificial intelligence to determine setpoints or a setpoint range that maintain a comfortable environment in a space (e.g., conditioned space 916 described with reference to FIG. 8). Based on the determined setpoints or setpoint range, system management controller 902 can generate control signals to operate HVAC equipment 904 to maintain the comfortable environment.

In some embodiments, system management controller 902 includes a processing circuit 1002. In some embodiments, processing circuit 1002 includes a processor 1004 and memory 1006. Processor 1004 can be implemented as a general-purpose processor, an application specific integrated circuit (ASIC), one or more field programmable gate arrays (FPGAs), a group of processing components, or other suitable electronic processing components.

Memory 1006 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 1006 may be or include volatile memory or non-volatile memory. Memory 1006 may include database components, object code components, script components, or any other type of information structure for supporting the various activities and information structures described in the present application. According to some embodiments, memory 1006 may be communicably connected to processor 1004 via processing circuit 1002 and includes computer code for executing (e.g., by processing circuit 1002 and/or processor 1004) one or more processes described herein.

Still referring to FIG. 10, system management controller 902 is shown to include a communications interface 1008. Communications interface 1008 may include wired or wireless interfaces (e.g., jacks, antennas, transmitters, receivers, transceivers, wire terminals, etc.) for conducting data communications with various systems, devices, or networks. For example, communications interface 1008 may include an Ethernet card and port for sending and receiving data via an Ethernet-based communications network and/or a Wi-Fi transceiver for communicating via a wireless communications network. Communications interface 1008 may be configured to communicate via local area networks or wide area networks (e.g., the Internet, a building WAN, etc.) and may use a variety of communications protocols (e.g., BACnet, IP, LON, etc.).

Communications interface 1008 may be a network interface configured to facilitate electronic data communications between system management controller 902 and various external systems or devices (e.g., thermostat 906, a user device 1028, weather service 918, etc.). For example, system management controller 902 may receive information from weather service 918 indicating one or more external weather conditions (e.g., temperature, humidity, air quality, etc.) via communications interface 1008. In some embodiments, communications interface 1008 is configured to provide control signals to HVAC equipment 904.

In some embodiments, user device 1028 can communicate an occupant comfort level to system management controller 902. User device 1028 can be for example, a smartphone, a desktop computer, a thermostat, a laptop computer, or any other type of device that a user (e.g., an occupant of conditioned space 916) can interact with to facilitate communication with system management controller 902. In some embodiments, system management controller 902 can poll a user for an occupant comfort rating via user device 1028. In some embodiments, system management controller 902 polls the user in order to determine if a current setpoint is comfortable to the user, or if the current setpoint should be adjusted. Based on a response from the user, system management controller 902 can modify constraints as needed to provide a more comfortable environment for the user.

Still referring to FIG. 10, memory 1006 is shown to include a data collector 1010. Data collector 1010 can be configured to collect and compile any and/or all data provided to system management controller 902. For example, data collector 1010 can aggregate conditions of conditioned space 916 as measured and provided by temperature sensor 910, humidity sensor 912, air quality sensor 914, etc. Data collector 1010 may gather data from video camera 926 in conditioned space 916 that monitor occupants for visible indications of occupant comfort level. In some embodiments, data collector 1010 receives some and/or all data via communications interface 1008. If data collector 1010 has collected data, data collector 1010 may provide the collected data to a model generator 1012, a model updater 1014, a constraint generator 1016, and/or a control signal generator 1020 of memory 1006. In some embodiments, one or more components of memory 1006 are combined into a single component. However, the components are shown separated in FIG. 10 for ease of explanation.

In some embodiments, data collector 1010 gathers building data indicating conditions of conditioned space 916 over a time period. In some embodiments, the time period is a predetermined amount of time (e.g., a day, a week, etc.) that system management controller 902 is configured to maintain occupant comfort during. In some embodiments, the time period is an optimization period utilized during a cost optimization performed in a model predictive control process. Model predictive control is described in greater detail below with reference to FIG. 10.

In some embodiments, the time period includes multiple subperiods. For each subperiod, building data indicating conditions of conditioned space 916 can be obtained. Further, each subperiod may include attributes relating to the subperiod. In some embodiments, the building data is time-varying as to differentiate between conditions at various subperiods. An attribute of a subperiod can be used when generating an occupant comfort model to more accurately determine how occupants react to varying conditions. For example, attributes of a subperiod may include a time of day, a day of a week, weather conditions, etc. Based on the attributes, the occupant comfort model can more accurately model occupant comfort relating to received building data.

In some embodiments, model generator 1012 is configured to generate an occupant comfort model that can be used by constraint generator 1016 to generate constraints (e.g., comfort constraints). The occupant comfort model generated by model generator 1012 can be any model that can be used by constraint generator 1016 to generate constraints. For example, the occupant comfort model may be a neural network model. As another example, the occupant comfort model can be any mathematical model (e.g., a linear equation, a piecewise function, etc.).

In some embodiments, the occupant comfort model is a convolutional neural network (CNN). A CNN is a type of feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. The CNN is also known as shift invariant or space invariant artificial neural network (SIANN), which is named based on its shared weights architecture and translation invariance characteristics. An example of a CNN is described in greater detail below with reference to FIG. 13.

In some embodiments, the occupant comfort model captures how occupant preferences change over time. For example, a predictive mean vote (PMV) function of comfort can be integrated into the occupant comfort model to ensure the occupant comfort model can capture changes to occupant comfort over time. The PMV function of comfort can be represented as a function of indoor temperature, humidity, air speed, radiative temperature, clothing, and metabolic rate. Some variables of the PMV may not be able to be measured, so a proxy value can be determined. For example, calculating a current solar angle can be used to estimate the radiative temperature affecting a space. As another example, clothing can be estimated based on outdoor conditions (e.g., cold outdoor conditions may indicate more clothing). As yet another example, the metabolic rate can be determined based on a time of day (e.g., metabolic rate may be higher in the morning rather than the evening). Each of the conditions of the PMV function may affect occupant comfort over time. As such, the occupant comfort model can be generated as to account for a time-varying nature of occupant comfort. Therefore, any results determined based on the occupant comfort model (e.g., comfort constraints) may have a time-varying nature as well.

In some embodiments, model generator 1012 generates the occupant comfort model in response to a determination that an occupant comfort model does not exist, a current occupant comfort model should be replaced, etc. In some embodiments, an occupant of conditioned space 916 provides an indication to model generator 1012 to generate the occupant comfort model (e.g., by starting a model training process). Model generator 1012 can use some and/or all of the collected data (e.g., the building data) provided by data collector 1010 when generating the occupant comfort model. In some embodiments, the occupant comfort model is used to determine a comfort range and/or to model occupant comfort, as described in greater detail below.

In some embodiments, model generator 1012 provides the occupant comfort model to model updater 1014. Model updater 1014 can use the occupant comfort model and the collected data provided by data collector 1010 to update the occupant comfort model based on new information provided to system management controller 902. In some embodiments, the occupant comfort model generated by model generator 1012 becomes antiquated as time progresses if the occupant comfort model is not updated. Updating the occupant comfort model can reflect changes in building 10, conditioned space 916, occupant preferences, etc., to better maintain an appropriate comfort range. For example, if new HVAC devices are added to conditioned space 916 and the occupant comfort model is not updated, constraints generated by constraint generator 1016 may reflect an inaccurate model of a comfort range for conditioned space 916. As such, model updater 1014 can update the occupant comfort model as needed to ensure an appropriate comfort range is maintained as time progresses. Likewise, an occupant of conditioned space 916 can indicate that model updater 1014 should update the occupant comfort model.

In some embodiments, model updater 1014 determines when the occupant comfort model has deviated too far from an accurate model of a comfort range for conditioned space 916, such that the occupant comfort model will not benefit significantly from updates. If model updater 1014 determines the occupant comfort model has deviated too far from an accurate representation of a comfort range for conditioned space 916, model updater 1014 may signal to model generator 1012 to generate a new occupant comfort model. In some embodiments, if a new occupant comfort model is generated by model generator 1012, a current occupant comfort model may be discarded and replaced by the new occupant comfort model. In some embodiments, model updater 1014 is a component of model generator 1012. As such, model generator 1012 may have some and/or all of the features of model updater 1014.

In some embodiments, model generator 1012 and/or model updater 1014 utilize occupant comfort data when generating and/or updating an occupant comfort model. In some embodiments, occupant comfort data is collected by monitoring occupant adjustments to setpoints. Each time an occupant manually adjusts a setpoint, system management controller 902 may determine that a current setpoint in conditioned space 916 is not optimal. For example, if an occupant increases a temperature setpoint in conditioned space 916 via thermostat 906, the increase may indicate that a current temperature setpoint is too cold. In general, an occupant setpoint adjustment is an indication that an occupant is uncomfortable. Based on occupant setpoint adjustments and attributes of subperiods (e.g., time of day, day of the week, outside air temperature, humidity, solar effects, etc.), additional occupant comfort data can be determined by system management controller 902 for generating the occupant comfort model. The additional occupant comfort data can be used to generate/update an occupant comfort model to better model occupant comfort and/or a comfort range.

In some embodiments, occupant comfort data is collected by performing experiments on conditioned space 916. During an experiment, occupant comfort data can be gathered to determine how occupants respond to the experiment. For example, an experiment may include determining an experimental setpoint, operating HVAC equipment 904 to maintain the experimental setpoint over the course of a day, and polling occupants for an occupant comfort rating for the day. On a next day (or a next time period), the experimental setpoint can be set to a different constant value and polling of occupants is repeated. Based on results of the polling, occupant comfort data related to the various experimental setpoints can be gathered. For example, if a first experimental setpoint for a first day resulted in high occupant comfort ratings, the first experimental setpoint may be close to an optimal comfort value. However, if a second experimental setpoint for a second day resulted in low occupant comfort ratings, the low occupant comfort ratings may indicate that the second experimental setpoint is not close to the optimal comfort value. Experimental setpoints can be provided to model generator 1012 by setpoint generator 1018. In some embodiments, setpoint generator 1018 is configured to estimate one or more experimental setpoints that maintain occupant comfort while optimizing costs associated with maintaining occupant comfort (e.g., power consumption costs, maintenance costs, etc.). As more experimental setpoint values are tested, an occupant comfort model can be generated and/or updated to more precisely model occupant comfort and a comfort range.

In some embodiments, occupant comfort data is collected via an occupant voting system. In some embodiments, the voting system includes a voting method (e.g., a mobile application, a website, a paper survey, etc.) that occupants can rate their occupant comfort level through. For example, the occupant voting system may include a mobile application that requests an occupant to rate their occupant comfort level three time per day (e.g., once in the morning, once in the afternoon, and once in the evening). In some embodiments, the occupant voting system can aggregate all occupant comfort level ratings for each voting session to determine if setpoints maintained a high level of occupant comfort. Based on voting results and attributes of subperiods (e.g., time of day, day of the week, outside air temperature, humidity, solar effects, etc.), an occupant comfort model can be generated/updated to be able to more precisely model occupant comfort and a comfort range.

In some embodiments, occupant comfort data is collected through monitoring occupants for visible indications of occupant comfort. Visible indications of occupant comfort can be captured by video camera 926. A visible indication may be, for example, an occupant shivering, an occupant sweating, body heat captured by an IR video camera, skin color (e.g., red skin may indicate the occupant is cold), etc. Based on the visible indications of occupants and attributes of subperiods (e.g., time of day, day of the week, weather conditions, outside air temperature, humidity, solar effects, etc.), an occupant comfort model can be generated/updated to be able to more precisely model occupant comfort and a comfort range.

Based on collected occupant comfort data various information regarding occupants can be determined and integrated to the occupant comfort model generated by model generator 1012. For example, the occupant comfort data may indicate occupant temperature preferences (e.g., a favorite temperature of the occupant). As another example, the occupant comfort data may indicate a tolerance of occupants for varying environmental conditions in a space. The tolerance of occupants may be, for example, that occupants tolerate temperatures 3 degrees Fahrenheit above and below a favorite temperature of the occupants. Said information can be included in the occupant comfort model if being generated. Further the occupant comfort model can be generated as to account for occupants' personal tradeoff between cost and comfort. For example, some occupants may find less comfortable conditions to be acceptable if costs of operating building equipment are reduced. However, some occupants may prioritize comfort and tolerate higher costs. As such, the occupant comfort model can be generated (or updated) to reflect how occupants make a tradeoff between comfort and cost based on the occupant comfort data. In some embodiments, the occupant comfort data is time-varying such that occupant preferences over time can be identified.

An occupant comfort model provided to constraint generator 1016 can model how occupants react (i.e., model occupant comfort) to different environmental conditions based on their setpoint choices. In some embodiments, the occupant comfort model provided to constraint generator 1016 models a comfort range necessary to maintain occupant comfort. Based on the occupant comfort model, constraint generator 1016 can generate constraints (e.g., comfort constraints) to provide to setpoint generator 1018. A constraint can be applied to various environmental conditions such as, for example, an indoor temperature, an indoor temperature setpoint, humidity, carbon dioxide levels, particulate matter 2.5 (PM2.5) levels, oxides of nitrogren ($NO_x$), etc. In some embodiments, the constraints are generated based on the occupant comfort model along with current data provided by data collector 1010. In some embodiments, a constraint generated by constraint generator 1016 indicates a maximum setpoint $T_{max}$ and a minimum setpoint $T_{min}$. A comfort range can be determined based on values of $T_{max}$ and $T_{min}$. The comfort range can be defined as values greater than or equal to $T_{min}$ and less than or equal to $T_{max}$. The comfort range can be determined by constraint generator 1016 such that occupant comfort is maintained for values within the comfort range. To generate values of $T_{max}$ and $T_{min}$, constraint generator 1016 can utilize the occupant comfort model to determine if occupant comfort is maintained for various setpoints and conditions. Based on outputs of the occupant comfort model, constraint generator 1016 can determine values of $T_{max}$ and $T_{min}$ to indicate a comfort range that maintains occupant comfort.

If determining constraints, constraint generator 1016 can calculate a Pareto frontier for an amount of savings given a range of values occupants find comfortable. A Pareto frontier can indicate all allocations that are Pareto efficient (i.e., an allocation that is impossible to reallocate as to improve any preferences without making at least one preference worse off). For example, a Pareto efficient point calculated by constraint generator 1016 may be a point such that if costs are reduced, occupant comfort will decrease and/or if occupant comfort is increased, costs are also increased. Using said information, constraint generator 1016 can calculate constraints (e.g., $T_{max}$ and $T_{min}$) based on occupant tradeoffs between cost and comfort as indicated by the occupant comfort model. For example, constraint generator 1016 may expand the comfort range set by the constraints to allow more flexibility in a cost optimization performed by setpoint generator 1018.

In some embodiments, constraints generated by constraint generator 1016 based on the occupant comfort model are time-varying. Occupant comfort preferences over time may change such that constraints (e.g., a comfort range) generated at a particular time may not maintain occupant comfort at a different time. If the constraints are time-varying, constraint generator 1016 may be required to occasionally generate new constraints to reflect how occupant comfort changes over time. For example, a comfort range determined in the morning of a day may not be applicable later in the day due to varying metabolic rates of occupants. Similarly, a tolerance of occupant to environmental conditions may change over time. For example, an occupant may be more tolerant of varying conditions (e.g., temperature, humidity, etc.) in the evening rather than the morning. As such, constraints generated based on the occupant comfort model may change over time to reflect how occupant tolerance adjusts over time. In some embodiments, constraint generator 1016 continuously updates the constraints. In some embodiments, constraint generator 1016 periodically updates the constraints (e.g., every 10 minutes, every hour, etc.). In some embodiments, constraint generator 1016 updates the constraints based on a condition change determined to warrant an update of the constraints. For example, constraint generator 1016 may update the constraints based on a 2° F. outdoor temperature increase, cloud cover receding, an indication that occupants entered a space, etc. By updating the constraints, constraint generator 1016 can ensure occupant comfort is maintained over time.

In some embodiments, constraints generated by constraint generator 1016 are provided to setpoint generator 1018. Setpoint generator 1018 can use the constraints to determine an optimal setpoint value. In some embodiments, the optimal setpoint value is determined using economic model predictive control. In some embodiments, setpoint generator 1018 includes any of the functionality of the economic model predictive control system described with reference to U.S. patent application Ser. No. 15/473,496, filed Mar. 29, 2017, to generate setpoints within a determined range, the entire disclosure of which is incorporated by reference herein. Economic model predictive control can be used to determine an optimal setpoint value that falls within the comfort range determined by constraint generator 1016 while optimizing costs associated with adjusting setpoints (e.g., power consumption costs, maintenance costs, etc.). For example, setpoint generator 1018 may determine an optimal setpoint value above $T_{min}$ and below a middle value of the setpoint range (i.e., halfway between $T_{min}$ and $T_{max}$) that maintains occupancy comfort and optimizes costs.

In some embodiments, setpoint generator 1018 provides a setpoint value to control signal generator 1020. In some embodiments, the setpoint value provided by setpoint generator 1018 is an optimal setpoint that reduces costs while adhering to constraints determined by constraint generator 1016. Control signal generator 1020 can use the setpoint value to determine control signals to control HVAC equipment 904. In some embodiments, control signal generator 1020 uses current data provided by data collector 1010 to determine what control signals are necessary to achieve the setpoint value determined by setpoint generator 1018. For example, if the setpoint value is a temperature setpoint value and the current data indicates a current temperature value in conditioned space 916 is above the temperature setpoint value, control signal generator 1020 can generate a control signal indicating an air conditioner of HVAC equipment 904 should be operated to reduce the current temperature in conditioned space 916 to the temperature setpoint value. In some embodiments, control signal generator 1020 provides control signals to HVAC equipment 904 via communications interface 1008.

Figure 11:
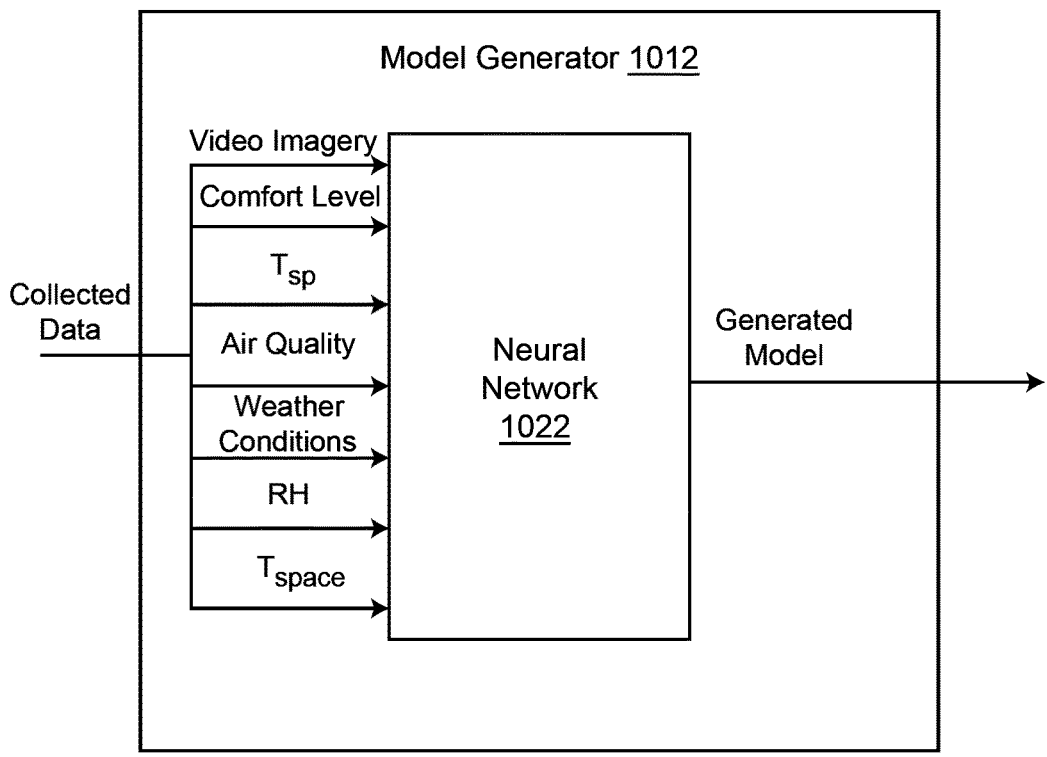
FIG. 11 is a block diagram of the model generator of FIG. 10 in greater detail, according to some embodiments.

Referring now to FIG. 11, model generator 1012 described with reference to FIG. 10 is shown in greater detail, according to some embodiments. Model generator 1012 is shown to include a neural network 1022. Neural network 1022 can be used to generate an occupant comfort model if the occupant comfort model is a neural network model. In some embodiments, model generator 1012 includes a different component than neural network 1022 to generate the occupant comfort model. In some embodiments, neural network 1022 is a convolutional neural network (CNN) similar to and/or the same as a CNN 1300 described in greater detail below with reference to FIG. 13. In some embodiments, neural network 1022 is configured to generate an occupant comfort model that is provided to model updater 1014 and/or constraint generator 1016. In some embodiments, neural network 1022 receives collected data from data collector 1010. The collected data is shown to include a comfort level of one or more occupants, a temperature setpoint $T_{sp}$, an air quality measurement, weather conditions, relative humidity RH, and a temperature of conditioned space 916 $T_{space}$. The collected data can also include other forms of data such as video imagery provided by one or more video cameras in conditioned space 916. In some embodiments, the collected data provided to model generator 1012 is time series data. If the collected data is time series data, neural network 1022 may be able to better model occupant comfort based on time-dependent information. For example, based on time series data, neural network 1022 may determine that a larger heat load is generally present mid-day than at night (e.g., due to the sun, due to more occupants in conditioned space 916, etc.). It should be considered that the collected data provided to neural network 1022 in FIG. 11 is shown as an example of some data that can be provided to neural network 1022. In some embodiments, the collected data provided to neural network 1022 includes more or less information than is shown in FIG. 11. For example, neural network 1022 can receive any sensor or user input information that is relevant to occupant comfort.

In some embodiments, an occupant comfort model generated by neural network 1022 can model occupant comfort based on environmental conditions and/or can model a comfort range necessary to maintain occupant comfort. A comfort range modeled by neural network 1022 should be large enough for setpoint generator 1018 to be able to provide energy cost savings and/or other operational savings when determining an optimal setpoint, according to some embodiments. In some embodiments, neural network 1022 directly predicts an upper bound and a lower bound of the comfort range. For setpoint generator 1018 to be able to provide energy cost savings and/or other operational savings, the comfort range modeled by neural network 1022 may require a minimum of amount of separation between the upper bound and the lower bound of the comfort range. For example, a 2-degree Celsius amount of separation may be sufficient for setpoint generator 1018 to be able to provide energy cost savings and/or other operational savings when determining a setpoint. In general, if the upper bound and lower bound of the comfort range are the same and/or are very close to each other, setpoint generator 1018 may not have flexibility in determining an optimal setpoint. In some embodiments, setpoint generator 1018 determines a setpoint subject to boundaries determined by the model using any of the functionality, techniques, approaches, etc. as described in U.S. patent application Ser. No. 15/473,496, filed Mar. 29, 2017, the entire disclosure of which is incorporated by reference herein.

Figure 12:
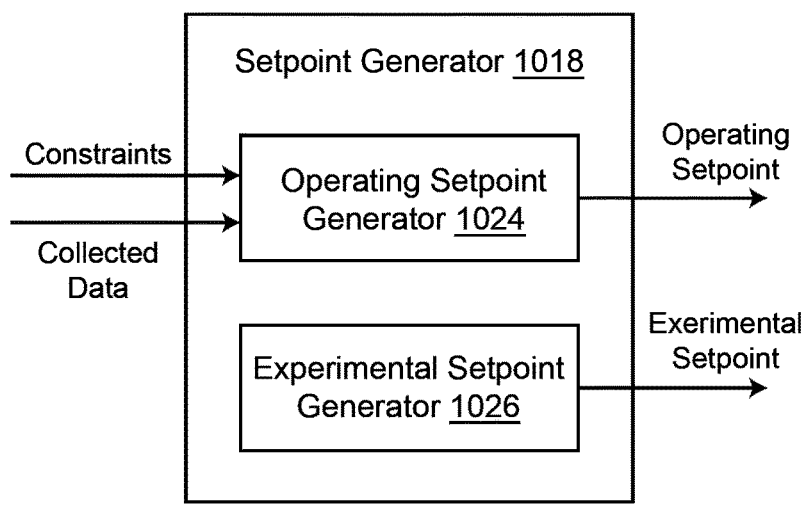
FIG. 12 is a block diagram of the setpoint generator of FIG. 10 in greater detail, according to some embodiments.

Referring now to FIG. 12, setpoint generator 1018 described with reference to FIG. 10 is shown in greater detail, according to some embodiments. Setpoint generator 1018 is shown to include an operating setpoint generator 1024 and an experimental setpoint generator 1026. Operating setpoint generator 1024 is shown to be output constraints and collected data. In some embodiments, the constraints define an upper bound and a lower bound on a comfort range. When generating an operating setpoint to be provided to control signal generator 1020, operating setpoint generator 1024 may be confined to determine the operating setpoint such that the operating setpoint is between the upper bound and the lower bound. If the operating setpoint falls outside the comfort range designated by the upper bound and the lower bound, the operating setpoint may not result in a comfortable environment for occupants of conditioned space 916. When determining the operating setpoint, operating setpoint generator 1024 may perform economic model predictive control to determine a setpoint within the comfort range that provides a largest economic benefit. Economic model predictive control can utilize the collected data to more precisely estimate an optimal operating setpoint based on environmental conditions indicated by the collected building data. After economic model predictive control is performed, the operating setpoint determined by operating setpoint generator 1024 may minimize costs while maintaining an adequate level of occupant comfort.

In some embodiments, experimental setpoint generator 1026 is configured to generate an experimental setpoint. The experimental setpoint can be used to conduct an experiment on conditioned space 916 to refine an occupant comfort model generated by model generator 1012 and/or updated by model updated 1014. HVAC equipment 904 can be operated to meet the experimental setpoint in conditioned space 916. If conditioned space 916 meets the experimental setpoint, occupants can be polled for their comfort levels (e.g., via user device 1028). In some embodiments, model generator 1012 uses the comfort levels indicated by the occupants and the experimental setpoint to determine whether or not the experimental setpoint maintains adequate occupant comfort levels. The determination of whether or not the experimental setpoint maintains adequate occupant comfort levels can then be used when modeling future comfort ranges and/or occupant comfort. In general, experimental setpoints generated by experimental setpoint generator 1026 can improve modeling performed by neural network 1022 to more accurately reflect occupant comfort. The experimental setpoint(s) can increase or decrease (or otherwise deviate) the setpoint of conditioned space 916 according to a predetermined pattern to tailor the occupant comfort model generated by model generator 1012 to the preferences/comfort of the specific occupants in conditioned space 916. Advantageously, this facilitates generating an occupant comfort model that specifically determines comfortable setpoints for the occupants of conditioned space 916. In particular, the occupant comfort model can be trained for specific occupants that occupy conditioned space 916.

Figure 13:
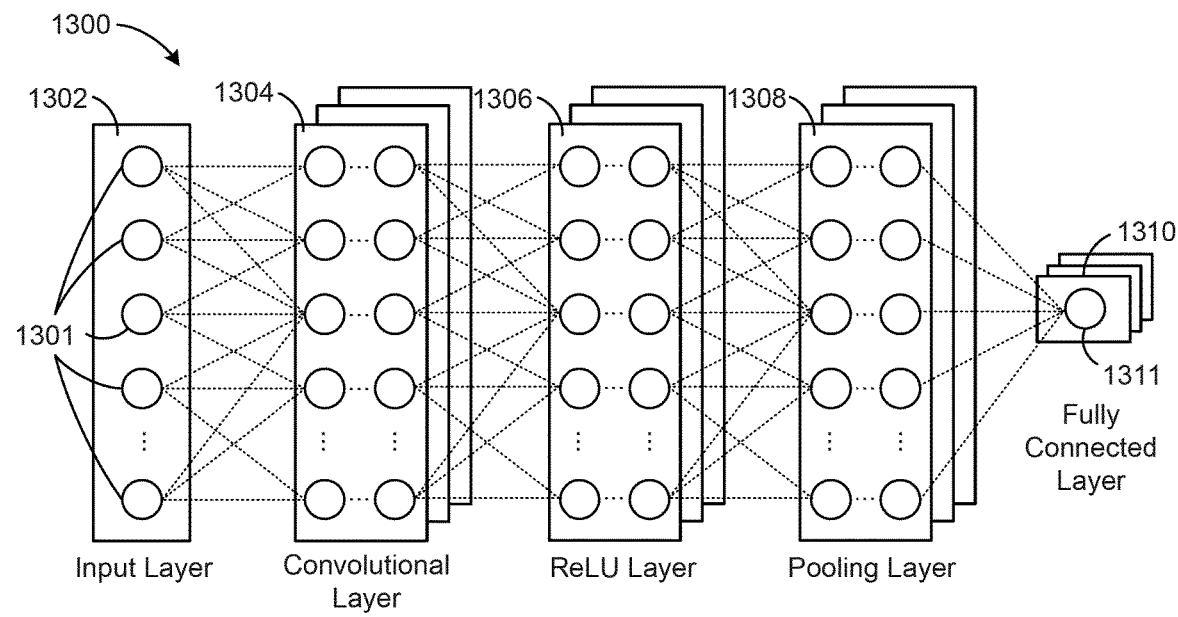
FIG. 13 is a block diagram of a convolutional neural network, according to some embodiments.

Referring now to FIG. 13, an example of a CNN 1300 is shown, according to an exemplary embodiment. CNN 1300 is shown to include a sequence of layers including an input layer 1302, a convolutional layer 1304, a rectified linear unit (ReLU) layer 1306, a pooling layer 1308, and a fully connected layer 1310 (i.e., an output layer). Each of layers 1302-1310 may transform one volume of activations to another through a differentiable function. Layers 1302-1310 can be stacked to form CNN 1300. Unlike a regular (i.e., non-convolutional) neural network, layers 1302-1310 may have neurons arranged in 3 dimensions: width, height, depth. The depth of the neurons refers to the third dimension of an activation volume, not to the depth of CNN 1300, which may refer to the total number of layers in CNN 1300. Some neurons in one or more of layers of CNN 1300 may only be connected to a small region of the layer before or after it, instead of all of the neurons in a fully-connected manner. In some embodiments, the final output layer of CNN 1300 (i.e., fully-connected layer 1310) is a single vector of class scores, arranged along the depth dimension.

In some embodiments, CNN 1300 is used to generate a comfort range for conditioned space 916 (e.g., an upper bound and a lower bound). The comfort range can be used by constraint generator 1016 to generate one or more constraints (e.g., comfort constraints) to be provided to setpoint generator 1018. When setpoint generator 1018 determines an optimal setpoint for conditioned space 916, the optimal setpoint may be within the constraints determined by constraint generator 1016. Although these specific examples are discussed in detail, it should be understood that CNN 1300 can be used to generate models and any other constraints necessary to maintain occupant comfort in conditioned space 916.

Input layer 1302 is shown to include a set of input neurons 1301. Each of input neurons 1301 may correspond to a variable that can be collected by data collector 1010 and used as an input to CNN 1300. For example, input neurons 1301 may correspond to variables such as outdoor air temperature (OAT) (e.g., a temperature value in degrees F. or degrees C.), the day of the week (e.g., 1=Sunday, 2=Monday, . . . , 7=Saturday), the day of the year (e.g., 0=January 1st, 1=January 2nd, . . . , 365=December 31st), a binary occupancy value for a building zone (e.g., 0=unoccupied, 1=occupied), a percentage of occupancy for the building zone (e.g., 0% if the building zone is unoccupied, 30% of the building zone is at 30% of maximum occupancy, 100% of the building zone is fully occupied, etc.), a measured temperature of conditioned space 916 (e.g., a temperature value in degrees F. or degrees C.), occupant comfort levels (e.g., ratings on a 0 to 5 scale collected via user device 1028), or any other variable that may be relevant to generating an appropriate comfort range.

Convolutional layer 1304 may receive input from input layer 1302 and provide output to ReLU layer 1306. In some embodiments, convolutional layer 1304 is the core building block of CNN 1300. The parameters of convolutional layer 1304 may include a set of learnable filters (or kernels), which have a small receptive field, but extend through the full depth of the input volume. During the forward pass, each filter may be convolved across the width and height of the input volume, computing the dot product between the entries of the filter and entries within input layer 1302 and producing a 2-dimensional activation map of that filter. As a result, CNN 1300 learns filters that activate when it detects some specific type of feature indicated by input layer 1302. Stacking the activation maps for all filters along the depth dimension forms the full output volume of convolutional layer 1304. Every entry in the output volume can thus also be interpreted as an output of a neuron that looks at a small region in input layer 1302 and shares parameters with neurons in the same activation map. In some embodiments, CNN 1300 includes more than one convolutional layer 1304.

ReLU layer 1306 may receive input from convolutional layer 1304 and may provide output to fully connected layer 1310. ReLU is the abbreviation of Rectified Linear Units. ReLu layer 1306 may apply a non-saturating activation function such as $f(x)=\max(0, x)$ to the input from convolutional layer 1304. ReLU layer 1306 may function to increase the nonlinear properties of the decision function and of the overall network without affecting the receptive fields of convolutional layer 1304. Other functions can also be used in ReLU layer 1306 to increase nonlinearity including, for example, the saturating hyperbolic tangent $f(x)=\tan h(x)$ or $f(x)=|\tan h(x)|$ and the sigmoid function $f(x)=(1+e^{-x})^{-1}$. The inclusion of ReLU layer 1306 may cause CNN 1300 to train several times faster without a significant penalty to generalization accuracy.

Pooling layer 1308 may receive input from ReLU layer 1306 and provide output to fully connected layer 1310. Pooling layer 1308 can be configured to perform a pooling operation on the input received from ReLU layer 1306. Pooling is a form of non-linear down-sampling. Pooling layer 1308 can use any of a variety of non-linear functions to implement pooling, including for example max pooling. Pooling layer 1308 can be configured to partition the input from ReLU layer 1306 into a set of non-overlapping sub-regions and, for each such sub-region, output the maximum. The intuition is that the exact location of a feature is less important than its rough location relative to other features. Pooling layer 1308 serves to progressively reduce the spatial size of the representation, to reduce the number of parameters and amount of computation in the network, and hence to also control overfitting. Accordingly, pooling layer 1308 provides a form of translation invariance.

In some embodiments, pooling layer 1308 operates independently on every depth slice of the input and resizes it spatially. For example, pooling layer 1308 may include filters of size 2×2 applied with a stride of 2 down-samples at every depth slice in the input by 2 along both width and height, discarding 75% of the activations. In this case, every max operation is over 4 numbers. The depth dimension remains unchanged. In addition to max pooling, pooling layer 1308 can also perform other functions, such as average pooling or L2-norm pooling.

In some embodiments, CNN 1300 includes multiple instances of convolutional layer 1304, ReLU layer 1306, and pooling layer 1308. For example, pooling layer 1308 may be followed by another instance of convolutional layer 1304, which may be followed by another instance of ReLU layer 1306, which may be followed by another instance of pooling layer 1308. Although only one set of layers 1304-1308 is shown in FIG. 13, it is understood that CNN 1300 may include one or more sets of layers 1304-1308 between input layer 1302 and fully-connected layer 1310. Accordingly, CNN 1300 may be an "M-layer" CNN, where M is the total number of layers between input layer 1302 and fully connected layer 1310.

Fully connected layer 1310 is the final layer in CNN 1300 and may be referred to as an output layer. Fully connected layer 1310 may follow one or more sets of layers 1304-1308 and may be perform the high-level reasoning in CNN 1300. In some embodiments, output neurons 1311 in fully connected layer 1310 may have full connections to all activations in the previous layer (i.e., an instance of pooling layer 1308). The activations of output neurons 1311 can hence be computed with a matrix multiplication followed by a bias offset. In some embodiments, output neurons 1311 within fully connected layer 1310 are arranged as a single vector of class scores along the depth dimension of CNN 1300.

In some embodiments, each of output neurons 1311 represents a threshold value (e.g., a boundary value, a boundary range around a setpoint, etc.) which can be used to formulate a constraint by constraint generator 1016. For example, one or more of output neurons 1311 may represent comfort range bounds for a conditioned space 916. The comfort range bounds can be used by constraint generator 1016 to generate and impose a comfort range constraint on setpoint generator 1018 when determining an optimal setpoint for conditioned space 916.

In some embodiments, model generator 1012 uses comfort data from sources such as manual adjustments to setpoints made by occupants, experiments on setpoints, and/or occupant voting regarding comfort levels to determine accuracy of an occupant comfort model generated by CNN 1300. If the comfort data indicates the occupant comfort model generated by CNN 1300 maintains adequate levels of occupant comfort, CNN 1300 may be reinforced, such that the reinforcement indicates a current occupant comfort model accurately models appropriate comfort ranges. However, if the comfort data indicates the occupant comfort model generated by CNN 1300 does not maintain adequate levels of occupant comfort, CNN 1300 may be updated and/or regenerated to provide a more accurate occupant comfort model.

Figure 14:
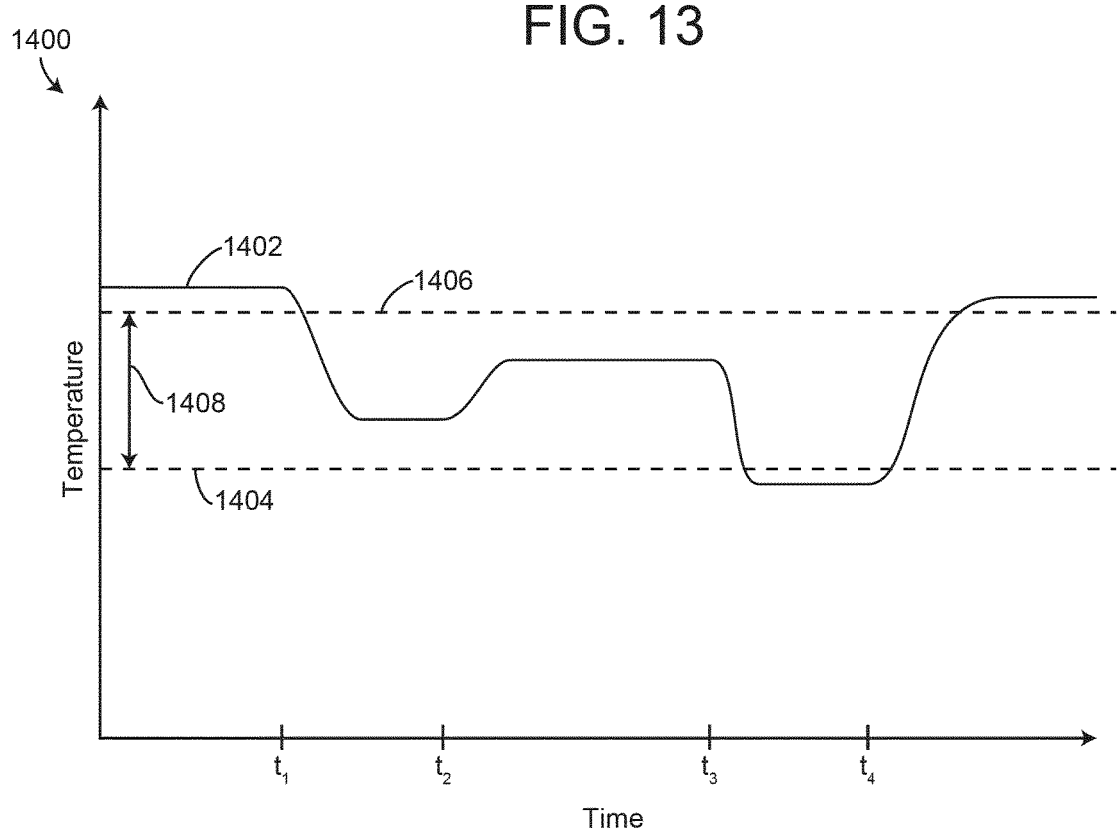
FIG. 14 is a graph illustrating temperature over time given one or more setpoint adjustments made by an occupant, according to some embodiments.

Referring now to FIG. 14, a graph 1400 illustrating varying temperature in a space over time due to occupant setpoint changes is shown, according to some embodiments. In some embodiments, graph 1400 illustrates varying temperature in a space over time due to occupant setpoint changes before a model is implemented (e.g., during a model training period). In general, a frequency of occupant setpoint changes and a magnitude of each occupant setpoint change can be used to predict occupant comfort (e.g., frequent occupant setpoint changes each with a high magnitude may indicate high occupant discomfort). Graph 1400 is shown to include a series 1402 illustrating temperature over a time period (e.g., a day, a portion of a day, etc.).

Graph 1400 is also shown to include an estimated comfort range 1408 with a lower bound 1404 and an upper bound 1406. In some embodiments, estimated comfort range 1408 is determined based on an occupant comfort model generated by model generator 1012. Estimated comfort range 1408 may be utilized before a model is implemented (e.g., during a model training period). As such, estimated comfort range 1408 may be an estimated predetermined range that can maintain occupant comfort in general circumstances. Estimated comfort range 1408 is shown not to vary even as occupant setpoint changes are made. During the time period shown in graph 1400, occupant setpoint changes are shown to occur at time steps $t_1$, $t_2$, $t_3$, and $t_4$. At time step $t_1$, a first occupant setpoint change is shown. Prior to the first occupant setpoint change, a temperature indicated by series 1402 exceeds upper bound 1406. When the temperature exceeds upper bound 1406, occupants may be uncomfortable and perform the first occupant setpoint change to reduce the temperature in the space. After the first occupant setpoint change, the temperature indicated by series 1402 is shown to drop into estimated comfort range 1408.

Graph 1400 is shown to include a second occupant setpoint change at time step $t_2$. Even though the temperature indicated by series 1402 is within the comfort range based on the occupant comfort model generated by model generator 1012, occupants may still find the room uncomfortable. As such, the second occupant setpoint change may be performed to increase the temperature in the space to a higher value. Likewise, a third occupant setpoint change at time step $t_3$ and a fourth occupant setpoint change at time step $t_4$ are shown to adjust the temperature in the space to meet desired occupant comfort.

In some embodiments, estimated comfort range 1408 does not change in response to occupant setpoint changes if more data is required to be collected to appropriately model how to change estimated comfort range 1408 based on occupant setpoint changes. In some embodiments, estimated comfort range 1408 does not change in response to occupant setpoint changes if an experiment is being performed on the space to determine how well estimated comfort range 1408 maintains occupant comfort over the time period. In this case, since multiple occupant setpoint changes were made, estimated comfort range 1408 may not appropriately model an appropriate comfort range.

Figure 15:
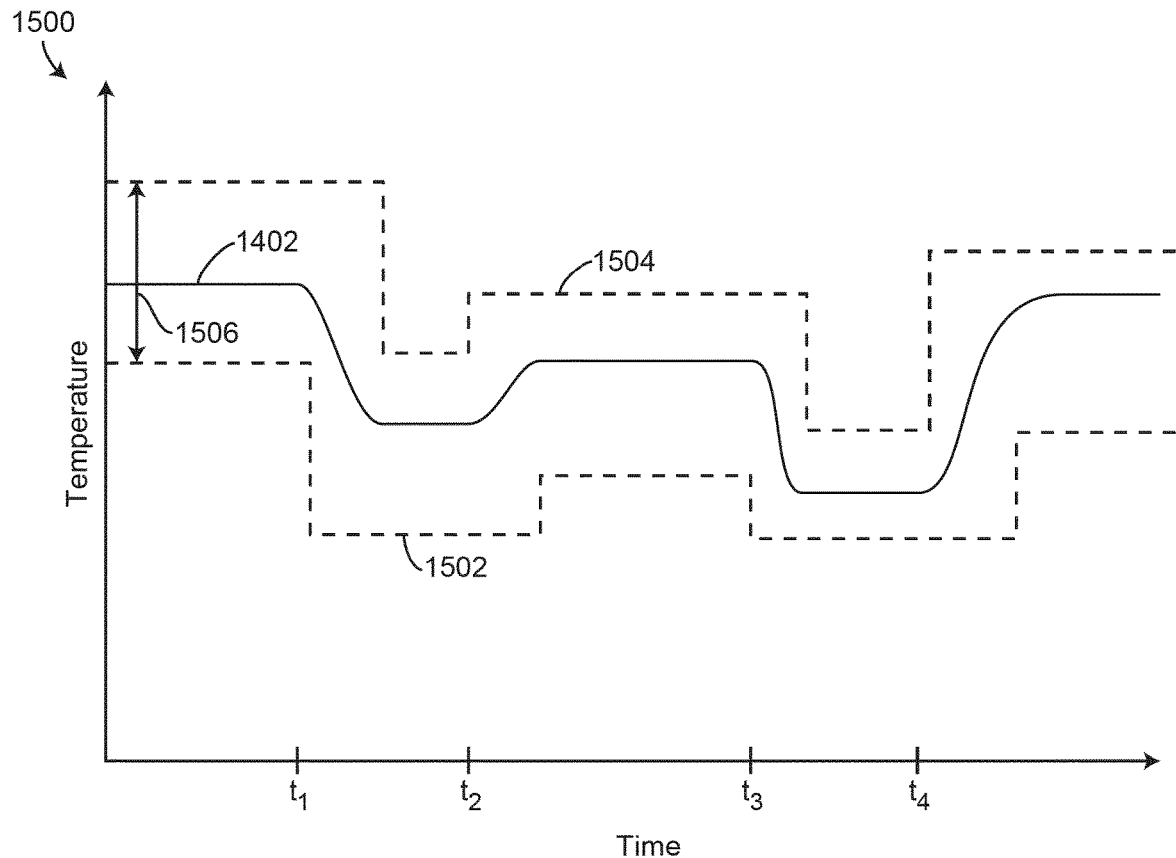
FIG. 15 is a graph illustrating temperature over time given multiple occupant setpoint adjustments, according to some embodiments.

Referring now to FIG. 15, a graph 1500 illustrating varying temperature in a space over time due to occupant setpoint changes is shown, according to some embodiments. In some embodiments, graph 1500 is similar to and/or the same as graph 1400 described with reference to FIG. 14. In some embodiments, graph 1500 illustrates varying temperature in a space over time due to occupant setpoint changes after a model is implemented. In graph 1500, a comfort range 1506, a lower bound 1502, and an upper bound 1504 are shown to vary over time in response to occupant setpoint changes, in comparison to estimated comfort range 1408, lower bound 1404, and upper bound 1406 described with reference to FIG. 14 respectively. In some embodiments, graph 1500 reflects how occupant comfort levels vary over the time period. When an occupant setpoint change is made, comfort range 1506, lower bound 1502, and upper bound 1504 can increase or decrease in response to the occupant setpoint change. In general, frequent and/or high magnitude occupant setpoint changes may indicate a higher level of occupant discomfort than infrequent and/or low magnitude occupant setpoint changes. Over time, the occupant comfort model can be updated to more accurately reflect occupant comfort levels based on conditions (e.g., environmental conditions). Over time the occupant comfort model can learn what setpoint range is appropriate at certain time steps during a time period. When a setpoint range is appropriate at a time step, no occupant setpoint changes may need to be made as an occupant may already be comfortable. Advantageously, a setpoint in comfort range 1506 can be determined such that the setpoint maintains occupant comfort and provides cost savings. Therefore, FIG. 15 may illustrate improvements to occupant comfort and cost savings by implementing a model driven system, rather than FIG. 14 which may not provide consistent occupant comfort and/or cost savings since a model is not implemented.

Figure 16:
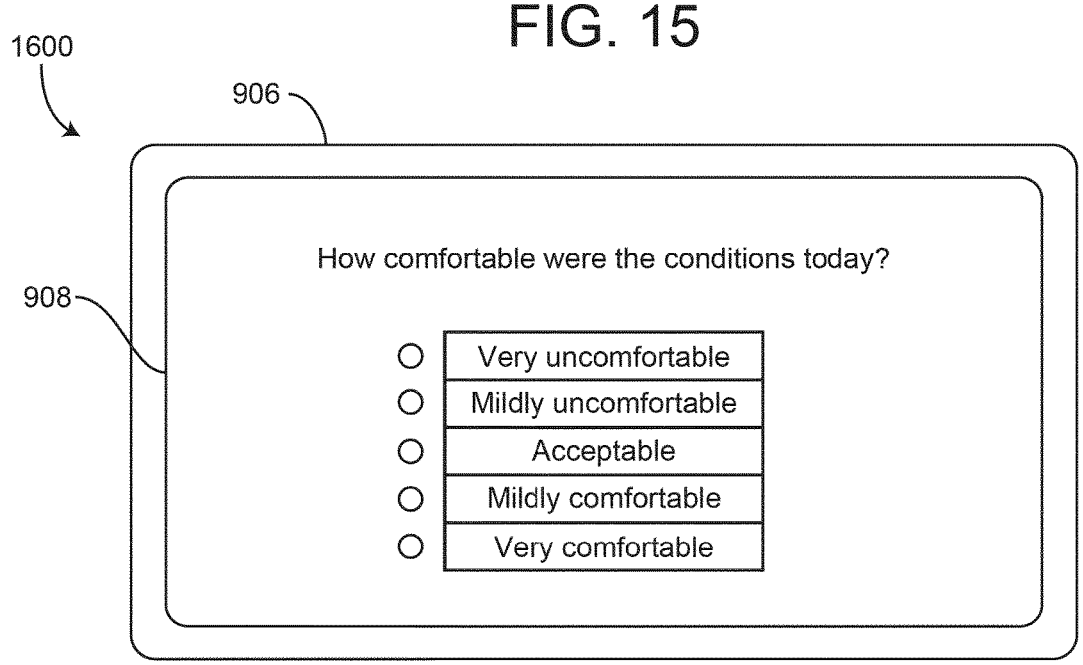
FIG. 16 is a block diagram illustrating an occupant voting application, according to some embodiments.

Referring now to FIG. 16, an occupant voting application 1600 is shown, according to some embodiments. Occupant voting application 1600 allows an occupant to rate how comfortable environmental conditions were over the course of a day or are currently. Occupant voting application 1600 is shown displayed on user interface 908 of thermostat 906 described with reference to FIG. 9. Occupant voting application 1600 can also be displayed on user device 1028 or any other device capable of allowing an occupant to interact with occupant voting application 1600. Occupant voting application 1600 is shown to allow an occupant to select one of five different rating options (i.e., very uncomfortable, mildly uncomfortable, acceptable, mildly comfortable, very comfortable). In some embodiments, occupant voting application 1600 has more or less options with the same and/or different wording. In general, occupant voting application 1600 can provide quantified feedback to model generator 1012 and/or model updater 1014 to determine how accurately an occupant comfort model models occupant comfort and/or a comfort range. For example, if a majority of occupants indicate they were very comfortable over the course of the day, the occupant comfort model may be accurate and only require little to no updating. As another example, if a majority of occupants indicate they were uncomfortable over the course of the day, the occupant comfort model may need to be updated and/or completely regenerated to more accurately reflect an appropriate comfort range. In some embodiments, comfort voting results can be used alongside various conditions as inputs to model generator 1012 and/or model updater 1014. For example, the five different rating options displayed on user interface 908 may indicate scores of 1-5 that can be directly input as the comfort voting results to model generator 1012 and/or model updater 1014.

Figure 17:
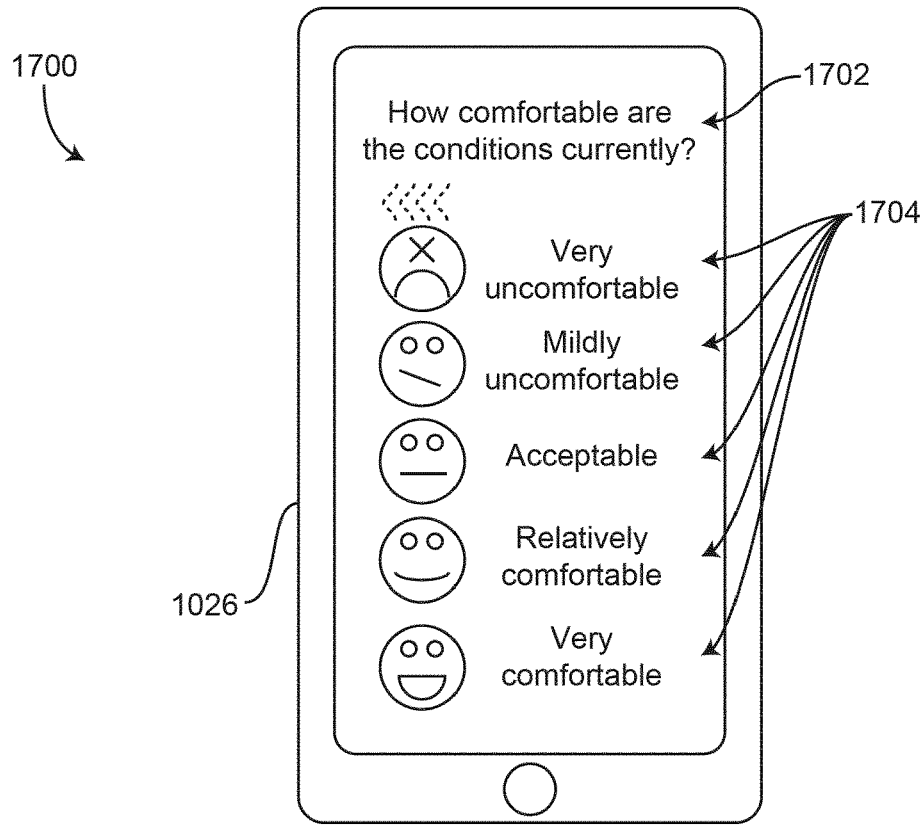
FIG. 17 is a block diagram illustrating another occupant voting application, according to some embodiments.

Referring now to FIG. 17, an occupant voting application 1700 is shown, according to some embodiments. In some embodiments, occupant voting application 1700 may be similar to and/or the same as occupant voting application 1600 described with reference to FIG. 16. Occupant voting application 1700 can allow an occupant to indicate to model generator 1012 and/or model updater 1014 how comfortable the occupant is at a current time. Occupant voting application 1700 is shown to be displayed on user device 1028, but can be displayed on thermostat 906 or any other device capable of allowing an occupant to interact with occupant voting application 1700. Occupant voting application 1700 is shown to include a question 1702 that asks how comfortable an occupant is at the current time, and answers 1704 indicating options an occupant can choose from. Question 1702 and answers 1704 are shown as an example of how occupant comfort levels can be gathered. Question 1702 and answers 1704 can be any combination of text, images, etc. that facilitate an occupant to rate their current comfort level via occupant voting application 1700.

In some embodiments, occupants are requested to rate their current comfort level multiple times through a day (e.g., every 10 minutes, every hour, every 3 hours, every day, etc.) via occupant voting application 1700. The more frequently occupants are requested to rate their current comfort level, the more accurately the occupant comfort model can be updated to model appropriate comfort ranges over a time period (e.g., a day). In some embodiments, occupants are requested to rate their current comfort level after an experimental setpoint has been achieved in conditioned space 916 (e.g., an experimental setpoint as generated by experimental setpoint generator 1026 while performing a learning-process).

Figure 18:
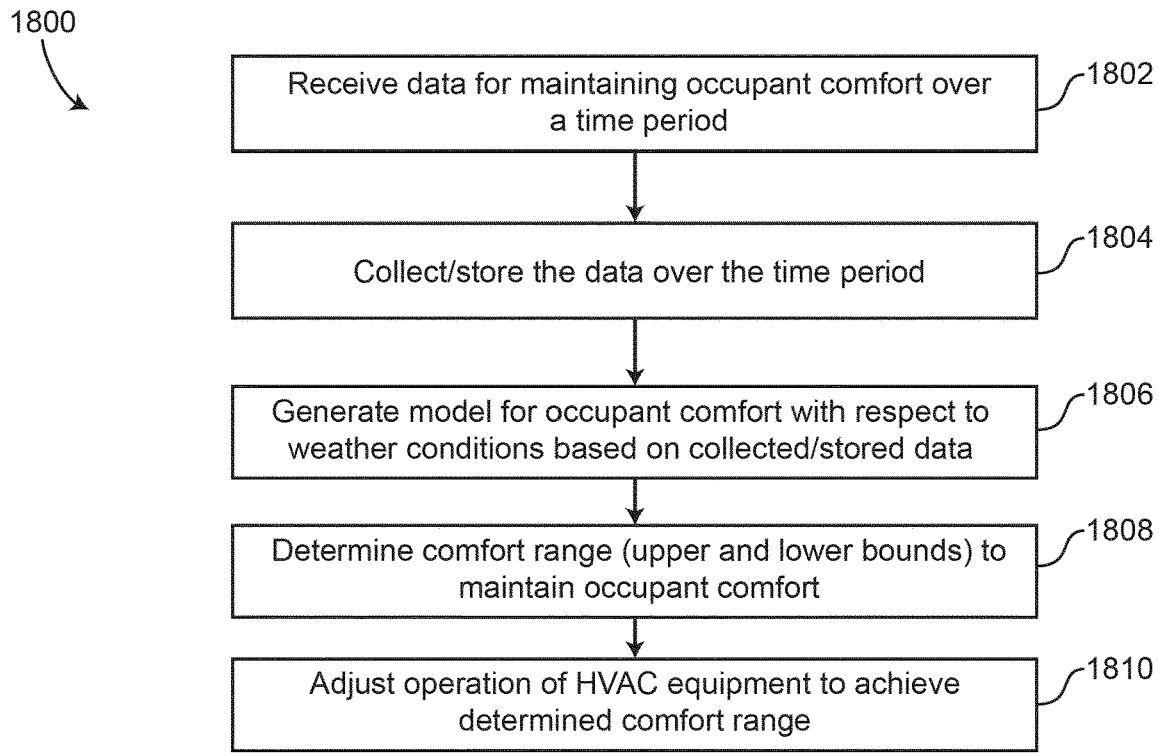
FIG. 18 is a flow diagram of a process for maintaining occupant comfort in a space based on an occupant comfort model, according to some embodiments.

Referring now to FIG. 18, a process 1800 for maintaining occupant comfort in a space based on an occupant comfort model is shown, according to some embodiments. Process 1800 can be continuously and/or occasionally performed to ensure occupants are comfortable in a space. For example, process 1800 may be performed every hour to ensure the space will provide comfort for the occupants.

Process 1800 is shown to include receiving data for maintaining occupant comfort over a time period (step 1802), according to some embodiments. The received data received in step 1802 can include, for example, comfort data (e.g., number of setpoint changes, magnitude of setpoint changes, direction of setpoint changes, etc.), environmental condition data, weather condition data, time of day, type of day, etc. The received data may be provided by user devices (e.g., smartphones, personal computers, etc.), building devices, a thermostat, external services, or any other device/service capable of providing information pertinent to maintaining occupant comfort. In some embodiments, step 1802 is performed by data collector 1010.

Process 1800 is shown to include collecting and storing the received data over the time period (step 1804), according to some embodiments. In some embodiments, the received data is parsed through with data unrelated to maintaining occupant comfort being removed. If all necessary data has been collected, the necessary data can be stored (e.g., in a database of data collector 1010). In some embodiments, data is stored until the time period is completed. Once the data is collected over the time period, the data can be provided to a model generator (e.g., model generator 1012) for use in generating a model. In some embodiments, step 1804 is performed by data collector 1010.

Process 1800 is shown to include generating a model for occupant comfort with respect to weather conditions based on the collected and stored data (step 1806), according to some embodiments. The generated model can allow for occupant comfort to be determined provided weather conditions, environmental conditions, etc., that can affect the space. For example, if an outdoor temperature is extremely cold, the model may indicate an occupant to be uncomfortable if no actions are taken to achieve an appropriate comfort range. The model can also indicate an appropriate comfort range based on the data collected and stored in step 1804. In some embodiments, step 1806 includes consideration for experimental data when determining the model. In order to generate an accurate model, experiments may be performed to test how occupants react to different comfort ranges (e.g., process 1900). If an experiment is/was performed, the model generated in step 1806 may account for results of a previous experiment and/or may be an experimental model that can be used to experiment with varying comfort ranges. In some embodiments, step 1806 is performed by model generator 1012.

Process 1800 is shown to include determining a comfort range with an upper bound and a lower bound to maintain occupant comfort (step 1808), according to some embodiments. The comfort range determined in step 1808 can be based on the model generated in step 1806. In some embodiments, the comfort range determined has a minimum amount of separation between the upper bound and the lower bound. For example, the comfort range may have a 2-degree Celsius difference to ensure that energy consumption can be optimized while still maintaining some level of comfort for occupants. If the comfort range is to small (e.g., the difference between the upper bound and lower bound is close to 0 or is 0), a setpoint in the room may be expensive and difficult to maintain as HVAC equipment may need perform extremely precise or frequent adjustments to maintain the setpoint. However, the comfort range should not be too large as to where comfort values near the upper bound and/or lower bound are uncomfortable for an occupant. In some embodiments, step 1808 is performed by constraint generator 1016.

Process 1800 is shown to include adjusting operation of HVAC equipment to achieve the comfort range determined in step 1808 (step 1810), according to some embodiments. Based on the comfort range, specific devices of the HVAC equipment may need to be operated to achieve the comfort range. To operate the specific devices properly, one or more control signals may need to be provided to the specific devices indicating what operations the specific devices should perform. For example, if the comfort range is a temperature comfort range indicating a current temperature should be between 20-degrees Celsius to 23-degrees Celsius and the current temperature is 19-degrees Celsius, a heating device of the HVAC equipment may receive control signals configured to operate the heating device to raise the current temperature to be within the temperature comfort range. As another example, if the comfort range is a humidity comfort range indicating a current humidity level should be between 45% humidity to 55% humidity and the current humidity level is 60% humidity, a dehumidifier of the HVAC equipment may receive control signals configured to operate the dehumidifier to reduce the current humidity level to be within the humidity comfort range. In some embodiments, step 1810 is performed by control signal generator 1020, communications interface 1008, and/or HVAC equipment 904.

Figure 19:
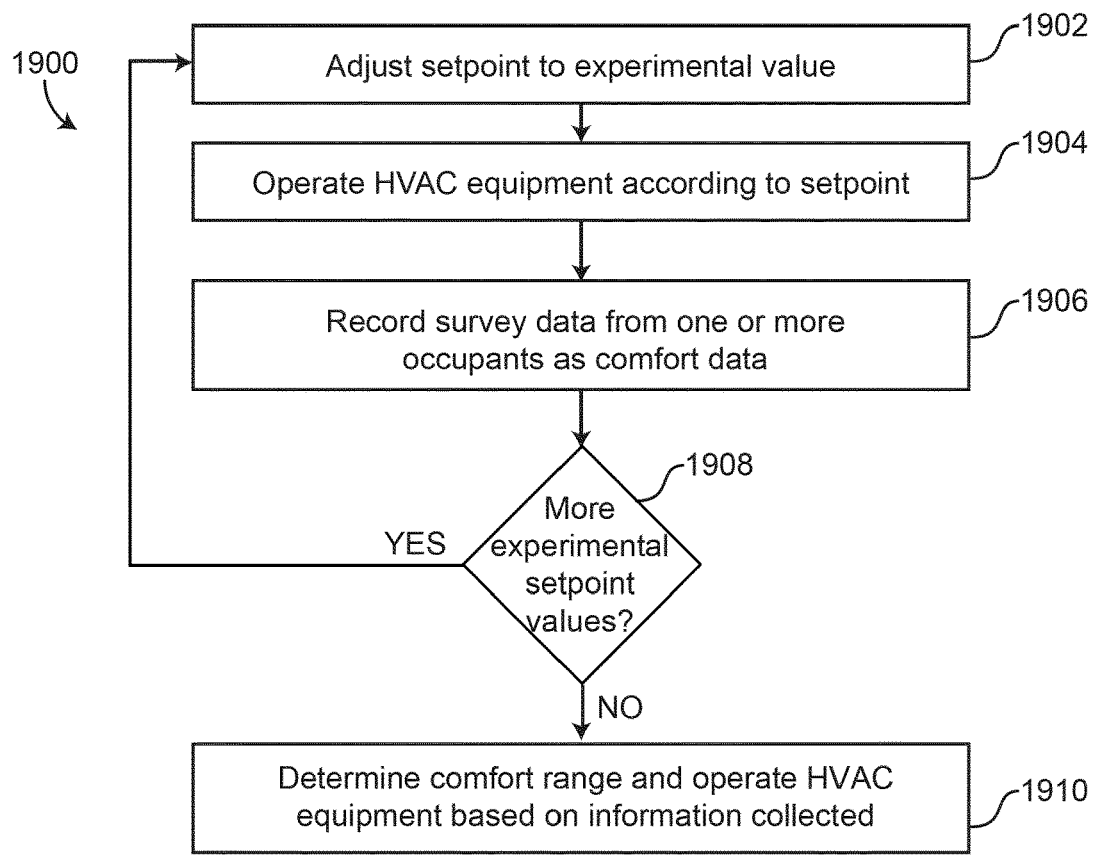
FIG. 19 is a flow diagram of a process for performing experiments to determine how occupants react to different setpoints, according to some embodiments.

Referring now to FIG. 19, a process 1900 for performing experiments to determine how occupants react to different setpoints (e.g., various environmental conditions) is shown, according to some embodiments. Process 1900 can be used to determine how comfortable occupants are in varying environmental conditions in a space to specifically tailor a model (e.g., the model as generated in process 1800) to an occupant's preferences. In some embodiments, process 1900 is used to determine if occupants are comfortable at more cost-effective setpoints. For example, a current temperature setpoint may be 23-degrees Celsius and a cost-effective setpoint may be 21-degrees Celsius. Assuming it is known that the current temperature setpoint is comfortable for occupants, process 1900 may be used to determine a new current temperature setpoint closer and/or equal to the cost-effective setpoint such that occupants are still comfortable and costs are reduced. In some embodiments, process 1900 may be used to determine whether various setpoints without relevant associated data maintain or do not maintain occupant comfort. For example, it may not be yet determined whether a temperature setpoint of 21-degrees Celsius maintains occupant comfort. As such, an experiment changing a current setpoint to 21-degrees Celsius can be performed to determine whether or not the temperature setpoint of 21-degrees Celsius maintains occupant comfort. As more setpoints are tested, a model may be able to more precisely determine appropriate setpoints as the model can be trained based on the tested setpoints.

Process 1900 is shown to include adjusting a setpoint to an experimental value (step 1902), according to some embodiments. The setpoint can be any setpoint used to maintain occupant comfort (e.g., temperature, humidity, etc.). The experimental value may be a possible value of the setpoint that is desired to be tested to see if occupant comfort is maintained at the experimental value. In some embodiments, step 1902 is performed by setpoint generator 1018. Setpoint generator 1018 can select or generate the experimental value of the setpoint from a predetermined testing procedure (e.g., a series of various experimental setpoints) to collect/gather occupant comfort information for a variety of environmental conditions.

Process 1900 is shown to include operating HVAC equipment according to the setpoint (step 1904), according to some embodiments. In some embodiments, the HVAC equipment may be configured to be operated if a current environmental value does not equal the setpoint value provided to the HVAC equipment. By operating the HVAC equipment, an environmental condition in the space can be adjusted to the setpoint adjusted to the experimental value in step 1902. As such, step 1904 may induce a change on one or more environmental conditions in the space. In some embodiments, step 1904 is performed by HVAC equipment 904 and control signal generator 1020.

Process 1900 is shown to include recording survey data from one or more occupants as comfort data (step 1906), according to some embodiments. Step 1906 allows for occupants to provide feedback on how comfortable they find the environmental conditions of the experimental value of the setpoint. If the occupants indicate the setpoint is uncomfortable, a model generated to model occupant comfort and/or comfort ranges may reflect the experimental value is uncomfortable. If the occupants indicate the setpoint is comfortable, a model generated to model occupant comfort and/or comfort ranges may reflect the experimental value is comfortable. If the occupants indicate the setpoint is neither comfortable nor uncomfortable (e.g., neutral), a model generated to model occupant comfort and/or comfort ranges may reflect that the experimental value is a possible value of the setpoint, but is not optimal in terms of occupant comfort. In some embodiments, step 1906 is performed by data collector 1010, thermostat 906, and/or user device 1028.

Process 1900 is shown to include making a determination if more experimental setpoint values should be tested (step 1908), according to some embodiments. If more experimental setpoint values should be tested, process 1900 can repeat starting at step 1902. If no more experimental setpoint values are to be tested, process 1900 can continue to step 1910. Repeating steps 1902-1906 can help determine more experimental values that maintain occupant comfort. In general, as more setpoint values that maintain occupant comfort are determined, more options are available when determining what a current setpoint should be. The more setpoint values allow for additional features such as cost optimization to have more flexibility when determining the current setpoint. For example, if only a single setpoint value is determined to maintain occupant comfort, little to no cost optimization can take place as the single setpoint value is the only setpoint value available. However, if ten setpoint values are determined to maintain occupant comfort, a most cost-effective setpoint value of the ten setpoint values can be selected to be the current setpoint. In some embodiments, step 1908 is performed by system management controller 902.

Process 1900 is shown to include determining a comfort range and operating HVAC equipment based on the information collected (step 1910), according to some embodiments. In some embodiments, the comfort range can be determined by performing process 1800 described with reference to FIG. 18. In some embodiments, the HVAC equipment is operated based on the information collected in steps 1902-1908. By performing process 1800, a model for occupant comfort and/or comfort ranges can be generated based on experimental values tested in process 1900. In general, as more experimental values are tested in process 1900, the more accurate the model generated in process 1800 will be as particular setpoint values may be determined to maintain and/or not maintain occupant comfort. Likewise, when the HVAC equipment is operated to achieve a comfort range determined by the model, cost optimization and/or other optimizations can be performed to optimize operation of the HVAC equipment (e.g., by reducing costs). In some embodiments, step 1910 is performed by system management controller 902.

Figure 20:
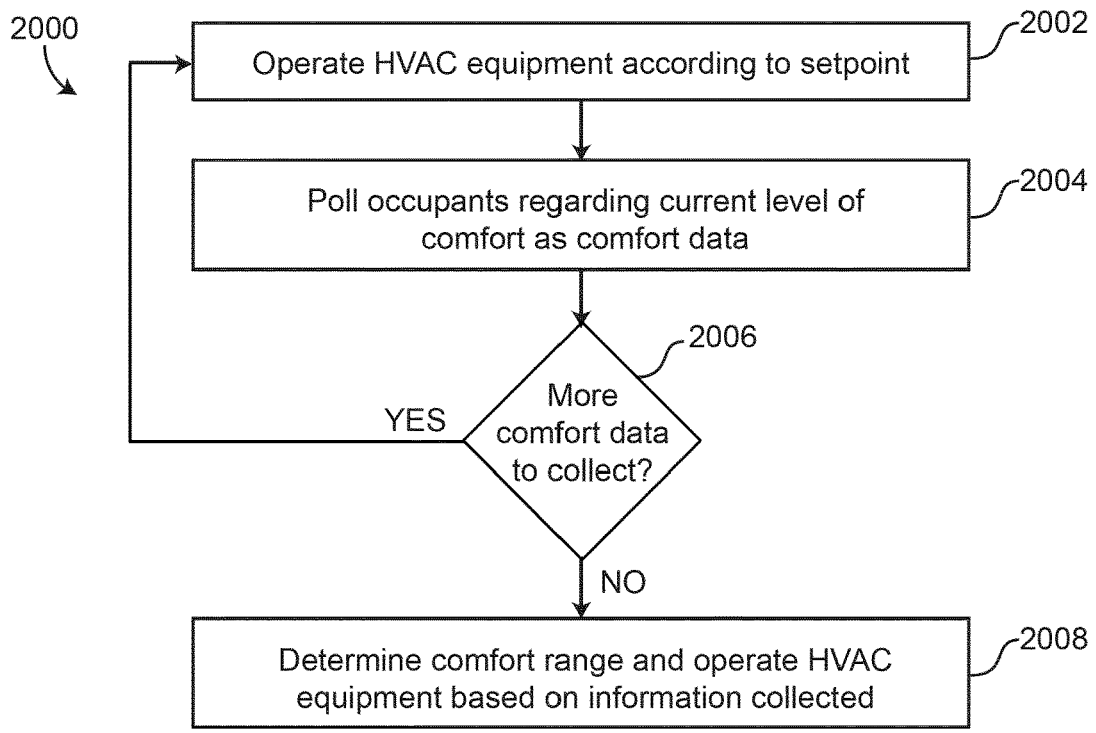
FIG. 20 is a flow diagram of a process for gathering comfort data by polling occupants, according to some embodiments.

Referring now to FIG. 20, a process 2000 for gathering comfort data by polling occupants is shown, according to some embodiments. Process 2000 can be used alone or in combination with process 1900 described with reference to FIG. 19 to determine setpoint values that maintain occupant comfort. Process 2000 may be performed multiple times (i.e., during multiple subperiods) throughout a time period (e.g., a day) to determine how comfortable occupants are during the time period. Process 2000 can be used to determine how occupant comfort varies throughout the time period. A setpoint value may not always maintain occupant comfort depending on subperiod attributes. For example, a temperature setpoint value of 23-degrees Celsius may be appropriate early in a day when the sun has not risen and limited solar effects are present. However, the temperature setpoint value of 23-degrees Celsius may be too high in the middle of the day when solar effects are higher. As such, process 2000 can help determine what setpoint value maintain occupant comfort over the time period.

Process 2000 is shown to include operating HVAC equipment according to a setpoint (step 2002), according to some embodiments. The setpoint the HVAC equipment is operated according to may be based on previous determinations of appropriate comfort ranges, current external weather conditions, and/or other determinations of appropriate setpoint values. In some embodiments, step 2002 is performed by HVAC equipment 904.

Process 2000 is shown to include polling occupants regarding a current level of comfort to determine comfort data (step 2004), according to some embodiments. The polling of occupants can be performed via, for example, a mobile application, a website form, a question on a thermostat, a paper survey, etc. Responses from the occupants be gathered and can indicate how comfortable the occupants are given current environmental conditions in a space. Based on the responses, a current setpoint may be determined to be appropriate or not appropriate to maintain occupant comfort based on external conditions (e.g., weather conditions). In some embodiments, step 2004 is performed by data collector 1010, thermostat 906, and/or user device 1028.

Process 2000 is shown to include making a determination if more comfort data is to be collected (step 2006), according to some embodiments. If more comfort data is to be collected, process 2000 may repeat starting at step 2002. If no more comfort data is to be collected, process 2000 can continue to step 2008. As described above, polling occupants multiple times throughout a time period may help in determining how occupants comfort preferences vary throughout the time period. For example, a setpoint value early in a time period may be comfortable, but the setpoint value may not be comfortable later in the time period. By repeating steps 2002-2004, comfort data may be able to be acquired indicating how comfortable setpoints are throughout the time period. In some embodiments, step 2006 is performed by system management controller 902.

Process 2000 is shown to include determining a comfort range and operating HVAC equipment based on the information collected (step 2008), according to some embodiments. In some embodiments, the comfort range can be determined by performing process 1800 described with reference to FIG. 18. In some embodiments, the HVAC equipment is operated based on the information collected in steps 2002-2006. By performing process 1800, a model for occupant comfort and/or comfort ranges can be generated based on comfort data gathered in process 2000. In general, as more comfort data is gathered indicating whether particular setpoint values are comfortable during certain times in a time period, the more accurate the model generated in process 1800 will be as particular setpoint values may be determined to maintain and/or not maintain occupant comfort throughout the time period. In some embodiments, step 2008 is performed by system management controller 902.

Figure 21:
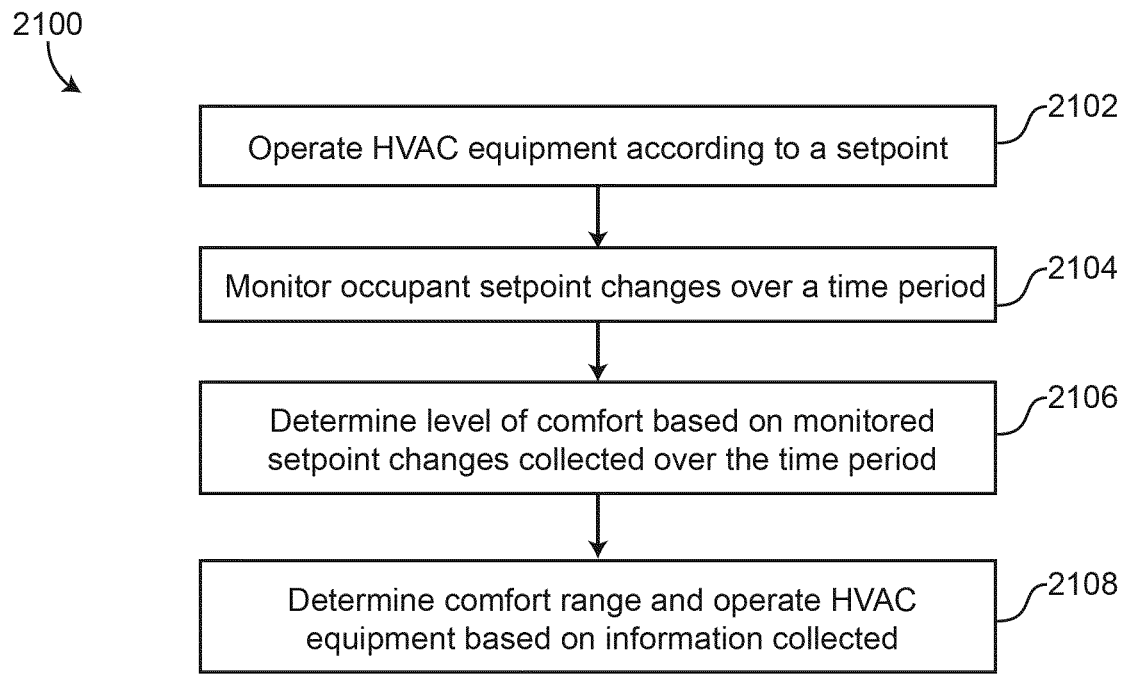
FIG. 21 is a flow diagram of a process for determining occupant comfort based on occupant setpoint changes, according to some embodiments.

Referring now to FIG. 21, a process 2100 for determining occupant comfort based on occupant setpoint changes is shown, according to some embodiments. Process 2100 can be used alone or in combination with process 1900 described with reference to FIG. 19 and/or with process 2000 described with reference to FIG. 20 to determine setpoint values that maintain occupant comfort. In some embodiments, occupant setpoint changes are an indication that an occupant is not comfortable based on current environmental conditions. Further, the magnitude of the occupant setpoint changes can indicate how uncomfortable the occupant is (e.g., a small magnitude may indicate mild discomfort while a large magnitude may indicate high discomfort). Based on a frequency of occupant setpoint changes and a magnitude of each occupant setpoint change, a new comfort range that better maintains occupant comfort can be determined.

Process 2100 is shown to include operating HVAC equipment according to a setpoint (step 2102), according to some embodiments. The setpoint the HVAC equipment is operated according to may be based on previous determinations of appropriate comfort ranges, current external weather conditions, and/or other determinations of appropriate setpoint values. In some embodiments, step 2102 is performed by HVAC equipment 904.

Process 2100 is shown to include monitoring occupant setpoint changes over a time period (step 2104), according to some embodiments. Every time an occupant setpoint change is detected, a time at which the occupant setpoint change occurs at and a magnitude of the occupant setpoint change can be recorded. In some embodiments, step 2104 is performed by data collector 1010.

Process 2100 is shown to include determining a level of comfort based on the monitored occupant setpoint changes collected over the time period (step 2106), according to some embodiments. As described above, a frequency of the occupant setpoint changes and a magnitude of each occupant setpoint change can indicate how comfortable an occupant is given current conditions of a space. In some embodiments, the frequency can be determined based on an average of the time between each occupant setpoint change. In general, as the average decreases, more occupant setpoint changes are made, indicating a higher level of occupant discomfort. However, if occupant setpoint changes do not occur frequently and each has a low magnitude, a higher level of occupant comfort may be determined. In some embodiments, step 2106 is performed by model generator 1012.

Process 2100 is shown to include determining a comfort range and operating HVAC equipment based on the information collected (step 2108), according to some embodiments. In some embodiments, the comfort range can be determined by performing process 1800 described with reference to FIG. 18. In some embodiments, the HVAC equipment is operated based on the information collected in steps 2102-2106. By performing process 1800, a model for occupant comfort and/or comfort ranges can be generated based on comfort data gathered in process 2100. In general, as more comfort data is gathered indicating whether particular setpoint values are comfortable during certain times in a time period based on occupant setpoint changes, the more accurate the model generated in process 1800 may be as particular setpoint values may be determined to maintain and/or not maintain occupant comfort throughout the time period. In some embodiments, step 2108 is performed by system management controller 902.

Figure 22:
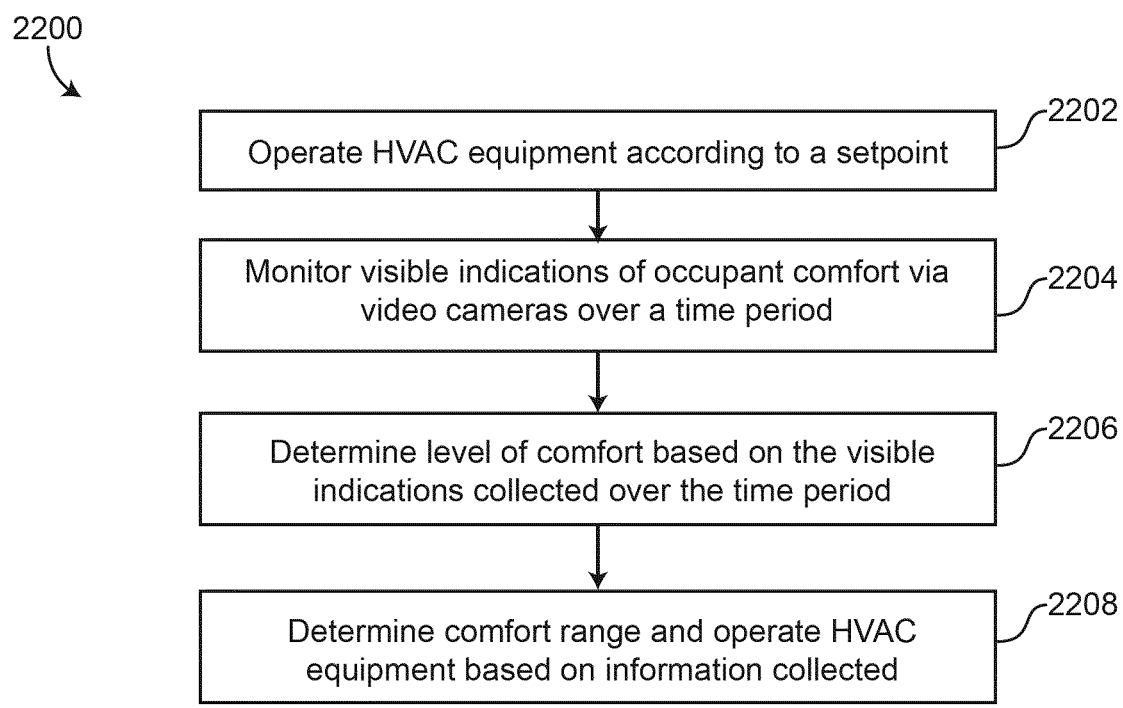
FIG. 22 is a flow diagram of a process for determining occupant comfort based on visible indications recorded by video cameras, according to some embodiments.

Referring now to FIG. 22, a process 2200 for determining occupant comfort based on visual indications recorded by video cameras is shown, according to some embodiments. Process 2200 can be used alone or in combination with process 1900 described with reference to FIG. 19, with process 2000 described with reference to FIG. 20, and/or with process 2100 described with reference to FIG. 21 to determine setpoint values that maintain occupant comfort. In some embodiments, visual indicators captured by the video cameras can be used to determine whether or not an occupant is comfortable. The visual cameras can include visual light cameras and/or infrared (IR) cameras to capture occupant comfort. For example, an occupant recorded by a visible light camera may have a red face indicating the occupant is too cold. As another example, an occupant recorded by an IR camera may display a high thermal signature indicating the occupant is too warm.

Process 2200 is shown to include operating HVAC equipment according to a setpoint (step 2202), according to some embodiments. The setpoint the HVAC equipment is operated according to may be based on previous determinations of appropriate comfort ranges, current external weather conditions, and/or other determinations of appropriate setpoint values. In some embodiments, step 2102 is performed by HVAC equipment 904.

Process 2200 is shown to include monitoring visible indications of occupant comfort via video cameras over a time period (step 2204), according to some embodiments. Various visible indications of occupants can be captured by the video cameras. For example, the video cameras may capture an occupant shivering, a visible indication that the occupant is cold. In some embodiments, step 2204 is performed by video camera 926.

Process 2200 is shown to include determining a level of comfort based on the visible indications collected over the time period (step 2206), according to some embodiments. The level of comfort determined can be based on a severity of the visible indications. For example, if an IR camera indicates an occupant has a body temperature slightly below an average human body temperature (e.g., 0.5-degrees Celsius below the average human body temperature) the occupant may be determined to be mildly uncomfortable. However, if the occupant has a body temperature far below the average human body temperature (e.g., 2 or more degrees Celsius below the average human body temperature), the occupant may be extremely uncomfortable. In some embodiments, step 2106 is performed by model generator 1012.

Process 2200 is shown to include determining a comfort range and operating HVAC equipment based on the information collected (step 2208), according to some embodiments. In some embodiments, the comfort range can be determined by performing process 1800 described with reference to FIG. 18. In some embodiments, the HVAC equipment is operated based on the information collected in steps 2202-2206. By performing process 1800, a model for occupant comfort and/or comfort ranges can be generated based on comfort data gathered in process 2200. In general, as more comfort data is gathered indicating based on the visible indications captured by the video cameras, the more accurate the model generated in process 1800 may be as particular setpoint values may be determined to maintain and/or not maintain occupant comfort throughout the time period. In some embodiments, step 2208 is performed by system management controller 902.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision step.

What is claimed is:

1. A controller for maintaining occupant comfort in a space of a building, the controller comprising:
   one or more processors; and
   one or more non-transitory computer-readable media storing instructions that, when executed by the one or more processors, cause the one or more processors to perform operations comprising:
      obtaining building data;
      obtaining occupant comfort data;
      generating an occupant comfort model based on the building data and the occupant comfort data, wherein the occupant comfort model predicts levels of occupant comfort within the space based on the building data;
      generating time-varying comfort constraints for an environmental condition of the space using the occupant comfort model;
      performing an optimization of an objective function to determine a setpoint for the building equipment, wherein the optimization is performed subject to the time-varying comfort constraints; and
      operating the building equipment based on the setpoint to affect a variable state or condition of the space to maintain the occupant comfort in the space.

2. The controller of claim 1, the operations further comprising updating the occupant comfort model in response to obtaining additional occupant comfort data.

3. The controller of claim 1, wherein the building data indicates one or more conditions of the space during each of a plurality of subperiods within a time period and describes a plurality of attributes of each of the plurality of subperiods, wherein the plurality of attributes of each of the plurality of subperiods comprise at least one of:
   a time of day;
   a day of a week; or
   weather conditions.

4. The controller of claim 1, wherein the time-varying comfort constraints define a temperature setpoint range for the space.

5. The controller of claim 1, wherein obtaining the occupant comfort data comprises monitoring occupant setpoint changes over a time period, the occupant setpoint changes indicating that one or more conditions of the space result in occupant discomfort.

6. The controller of claim 1, wherein obtaining the occupant comfort data comprises:
generating an experimental setpoint;
operating the building equipment to drive one or more conditions of the space to the experimental setpoint; and
surveying an occupant of the space for the level of occupant comfort.

7. The controller of claim 1, wherein obtaining the occupant comfort data comprises receiving votes from an occupant over a time period regarding the level of occupant comfort.

8. The controller of claim 1, wherein:
obtaining the occupant comfort data comprises monitoring an occupant for one or more visible indications of the level of occupant comfort based on information received from a visual detection device; and
the occupant comfort model is generated based on the one or more visible indications of the level of occupant comfort.

9. An environmental control system for maintaining occupant comfort in a space of a building, the environmental control system comprising:
building equipment operable to affect a variable state or condition of the space;
one or more environmental sensors configured to collect building data; and
a controller comprising a processing circuit configured to:
receive the building data from the one or more environmental sensors;
obtain occupant comfort data;
generate an occupant comfort model by training a neural network with the building data and the occupant comfort data, wherein the occupant comfort model predicts levels of occupant comfort within the space based on the building data;
generate time-varying comfort constraints for an environmental condition of the space using the occupant comfort model;
perform an optimization to determine a setpoint for the building equipment, wherein the optimization is performed subject to the time-varying comfort constraints; and
operate the building equipment based on the setpoint to affect the variable state or condition of the space to maintain the occupant comfort in the space.

10. The environmental control system of claim 9, wherein the processing circuit is configured to update the occupant comfort model in response to obtaining additional occupant comfort data.

11. The environmental control system of claim 9, wherein the time-varying comfort constraints define a temperature setpoint range for the space.

12. The environmental control system of claim 9, wherein obtaining the occupant comfort data comprises monitoring occupant setpoint changes over a time period, the occupant setpoint changes indicating that one or more conditions of the space result in occupant discomfort.

13. The environmental control system of claim 9, wherein obtaining the occupant comfort data comprises:
generating an experimental setpoint;
operating the building equipment to drive one or more conditions of the space to the experimental setpoint; and
surveying an occupant of the space for the level of occupant comfort.

14. The environmental control system of claim 9, wherein obtaining the occupant comfort data comprises receiving votes from an occupant over a time period regarding the level of occupant comfort.

15. The environmental control system of claim 9, further comprising a visual detection device, wherein the processing circuit is further configured to:
monitor an occupant for one or more visible indications of the level of occupant comfort based on information received from the visual detection device; and
generate the occupant comfort model based on the one or more visible indications of the level of occupant comfort.

16. A method for maintaining occupant comfort in a space of a building, the method comprising:
obtaining an occupant comfort model, wherein the occupant comfort model is a neural network that predicts a level of occupant comfort within the space based on building data;
generating time-varying comfort constraints for an environmental condition of the space using the occupant comfort model;
performing an optimization subject to the time-varying comfort constraints to determine a setpoint for building equipment; and
operating the building equipment based on the setpoint to affect a variable state or condition of the space to maintain the occupant comfort in the space.

17. The method of claim 16, further comprising:
determining whether the occupant comfort model requires updating; and
updating the occupant comfort model in response to determining the occupant comfort model requires updating.

18. The method of claim 16, wherein the time-varying comfort constraints define a temperature setpoint range for the space.

19. The method of claim 16, wherein the time-varying comfort constraints are ranges of values of the environmental condition that maintains the occupant comfort in the space.

20. The method of claim 16, wherein the occupant comfort model is updated based on a determination that an occupant is uncomfortable in the space.

* * * * *